United States Patent
Moilanen et al.

(10) Patent No.: US 9,923,631 B1
(45) Date of Patent: Mar. 20, 2018

(54) OPTICAL SIGNAL PROCESSING CHARACTERIZATION OF MICROWAVE AND ELECTRO-OPTIC DEVICES

(71) Applicant: EOSpace Inc., Redmond, WA (US)

(72) Inventors: David Emil Moilanen, Bellevue, WA (US); Matthew Allen Hall, Chicago, IL (US)

(73) Assignee: EOSpace Inc., Redmond, WA (US)

( * ) Notice: Subject to any disclaimer, the term of this patent is extended or adjusted under 35 U.S.C. 154(b) by 231 days.

(21) Appl. No.: 14/674,885

(22) Filed: Mar. 31, 2015

Related U.S. Application Data

(60) Provisional application No. 61/972,631, filed on Mar. 31, 2014.

(51) Int. Cl.
*H04B 17/00* (2015.01)
*H04B 10/079* (2013.01)
*H04B 10/54* (2013.01)

(52) U.S. Cl.
CPC ... *H04B 10/0795* (2013.01); *H04B 10/07955* (2013.01); *H04B 10/541* (2013.01)

(58) Field of Classification Search
None
See application file for complete search history.

(56) References Cited

U.S. PATENT DOCUMENTS

| | | | |
|---|---|---|---|
| 5,359,412 A | 10/1994 | Schulz | |
| 5,724,169 A | 3/1998 | LaGasse | |
| 6,072,919 A * | 6/2000 | Dennis | G02F 1/225 385/1 |
| 6,204,954 B1 | 3/2001 | Nagarajan | |
| 6,434,285 B1 * | 8/2002 | Blake | G01R 31/02 250/225 |
| 7,877,020 B1 * | 1/2011 | Hayes | H04B 10/50 398/183 |
| 8,023,831 B1 * | 9/2011 | Hayes | H04B 10/50 398/140 |

(Continued)

OTHER PUBLICATIONS

Curtis, Ames, Optical Test Set for Microwave Fiber-Optic Network Analysis, IEEE Transactions on Microwave Theory and Techniques, May 1990, 552-559, vol. 38, No. 5, Institute of Electrical and Electronics Engineers, USA.

(Continued)

*Primary Examiner* — Tesfaldet Bocure
(74) *Attorney, Agent, or Firm* — James Creighton Wray; Meera P. Narasimham

(57) ABSTRACT

The invention introduces a new RF test and measurement methodology based on optical signal processing that has the capability to measure all of the RF parameters (both amplitude and phase) of an electronic component or system including transmission ($S_{21}$) and reflection ($S_{11}$). It can also be applied to measuring the electro-optic properties of electro-optic modulators, both phase modulators and intensity modulators. The basis of the invention is to use the RF information encoded in the optical sidebands generated by an electro-optic modulator to determine all of the relevant parameters of an electronic or electro-optic device. Optical carrier suppression techniques are used to isolate the information carrying optical sidebands from the dominant optical carrier.

18 Claims, 18 Drawing Sheets

(56) References Cited

U.S. PATENT DOCUMENTS

| | | | | |
|---|---|---|---|---|
| 8,934,058 B2* | 1/2015 | Chou | .................... | H04B 10/69 |
| | | | | 341/137 |
| 2003/0063837 A1* | 4/2003 | Gupta | .................. | G02F 1/0121 |
| | | | | 385/15 |
| 2005/0286907 A1* | 12/2005 | Masuda | ........... | H04B 10/25758 |
| | | | | 398/186 |
| 2014/0098408 A1* | 4/2014 | Williams | ................ | G02F 3/026 |
| | | | | 359/108 |

OTHER PUBLICATIONS

Oikawa, Kawanishi, Izutsu, Measurement of Chirp Parameters and Halfwave Voltages of Mach Zehnder-Type Optical Modulators by Using a Small Signal Operation, IEEE Photonics Technology Letters, May 2003, 682-684, vol. 15, No. 5, Institute of Electrical and Electronics Engineers, USA.

Shi, Yan, Willner, High-Speed Electrooptic Modulator Characterization Using Optical Spectrum Analysis, Journal of Lightwave Technology, Oct. 2003, 2358-2367, vol. 21, No. 10, Institute of Electrical and Electronics Engineers, USA.

\* cited by examiner

OPTICAL SIGNAL PROCESSING CHARACTERIZATION OF MICROWAVE AND ELECTRO-OPTIC DEVICES

This application claims the benefit of U.S. Provisional Application No. 61/972,631 filed Mar. 31, 2014, which is hereby incorporated by reference in its entirety as if fully set forth herein.

This invention was made with Government support under Contract FA8650-10-C-7002 awarded by DARPA TROPHY I/II and Contract # N00024-13-P-4038 awarded by the Department of the Navy.

FIELD OF THE INVENTION

Electro-optic modulator test and measurement, RF test and measurement, RF device characterization, RF spectrum analysis, remote sensing, embedded test.

BACKGROUND OF THE INVENTION

Test and measurement is a critical part of product and system development both at the prototype stage as well as during production. Increasingly, many products and systems employ high frequency microwave and millimeter wave electrical signals. These include modern optical communication systems, radar, electronic warfare, sensors, etc. Testing the performance and functionality of these systems, both at the component level and the system level, requires advanced high frequency test equipment.

The most common methods for RF device and system test and measurement include the use of vector network analyzers (VNAs) or RF spectrum analyzers.

Electro-optic modulator test and measurement has primarily been accomplished using either an optical spectrum analysis approach or various RF in to RF out based approaches. One of the most common RF in to RF out approaches involves using a vector network analyzer and a calibrated photodetector to measure the response of an electro-optic modulator.

The primary deficiencies with optical spectrum analysis based approaches for electro-optic modulator characterization are that they are slow, expensive, often low resolution, and have limited wavelength ranges. They are slow because the entire optical spectrum must be scanned at each RF frequency point. In grating based optical spectrum analyzers spectrum acquisition alone can be a lengthy process. Following acquisition, the trace that is collected must be processed to determine the amplitudes of the various optical sidebands to compute the electro-optic modulator response at that frequency. Optical spectrum analyzers are expensive pieces of test equipment with state of the art instruments in the $100k range. Grating based optical spectrum analyzers (OSAs) typically offer a wider wavelength range than other types of OSAs, but their frequency resolution is limited by their gratings. This limits the utility of these devices for measuring low RF frequencies. High resolution OSAs typically only operate over a limited wavelength range.

The primary deficiency with RF based approaches for electro-optic modulator characterization is that the most common approaches require both a calibrated RF VNA and a calibrated high speed photodetector. While RF VNAs are excellent instruments, calibrated photodetectors are less reliable. In addition, both of these units are expensive, and calibrated high speed photodetectors may not be available at certain wavelengths. The prior art includes other more novel techniques to avoid using high speed detectors. Some of these approaches utilize one or more tunable laser sources to optically mix the sidebands generated by an electro-optic modulator down to low RF frequencies where they can be measured using a low speed detector. It is clear that using multiple lasers and tunable lasers increases the cost and complexity and reduces the reliability of the measurement system.

The closest all optical approach is U.S. Pat. No. 6,204,954. In this patent, the inventor measures the reduction in peak intensity when a Mach Zehnder modulator biased at peak is driven with an RF signal and uses this to determine the $V_\pi$ of the modulator. This approach uses only low speed detectors, but it has a limited sensitivity due to the fact that the optical power that is detected is dominated by the optical carrier. Essentially they measure a small signal on a large background.

Needs exist for improved test and measurement of electro-optic modulators and RF devices and systems.

SUMMARY OF THE INVENTION

The present invention introduces a new test and measurement methodology based on optical signal processing. The invention has the capability to measure all of the RF parameters (both amplitude and phase) of an electronic component or system including transmission ($S_{21}$) and reflection ($S_{11}$). It can also be applied to measuring the electro-optic properties of electro-optic modulators, both phase modulators and intensity modulators. The basis of the invention is to use the RF information encoded in the optical sidebands generated by an electro-optic modulator to determine all of the relevant parameters of an electronic or electro-optic device.

This invention is broadly applicable to a range of electronic and electro-optic test and measurement applications. These include electronic test and measurement instruments such as microwave spectrum analyzers and vector network analyzers. It can also be applied to electro-optic modulator characterization and a host of other RF applications that rely on a comparison of RF amplitude, phase, and frequency including: in-line radar and electronic warfare system health monitoring, differential RF phase measurements, RF signal cancellation, detection of small RF frequency offsets, and remote sensing of electronic signals.

The invention provides new techniques:

to isolate the electronic information stored in the optical sidebands generated by electro-optic modulation that utilizes suppression of the optical carrier, to measure the electro-optic characteristics of an electro-optic phase modulator that utilizes suppression of the optical carrier, to measure the electro-optic characteristics of an electro-optic Mach-Zehnder intensity modulator that utilizes suppression of the optical carrier, to measure the chirp parameter of an electro-optic Mach-Zehnder intensity modulator that utilizes suppression of the optical carrier, to measure the RF reflection and transmission amplitude and phase of active and passive RF components using electro-optic modulators, to measure the RF spectrum (Spectrum Analyzer) that uses electro-optic modulators, for remote RF sensing that uses electro-optic modulators, for in-line embedded RF tests that use electro-optic modulators, for differential RF phase measurements that use electro-optic modulators, for RF signal cancellation or suppression using electro-optic modulators, and for detection of small RF frequency differences that uses electro-optic modulators.

Problems that exist with conventional test and measurement systems are solved by the present invention.

For many years, test and measurement systems for electronic and electro-optic devices have been based on the technologies initially developed for electronic testing. The primary electronic test and measurement tool is the vector network analyzer, which allows a user to characterize all of the electronic (RF) parameters of a device including its electronic transmission and reflection as a function of RF frequency. Vector network analyzers are extremely useful tools, but the broadband test sets, including directional couplers, power sensors, etc., required for today's technologies are complex and prohibitively expensive. The present invention provides a much simpler and lower cost approach to RF test and measurement that is easily scalable to very high frequencies, unlike conventional vector network analyzers.

A second problem that the present invention addresses is the need for a low cost, reliable technique for characterizing electro-optic modulators. The electro-optic modulator is the foundation of optical communication systems, analog and digital optical links, and is finding increasing use as today's information technology infrastructure requires the ability to send ever increasing amounts of data at high rates and over long distances. In order to design these optical systems for transporting electrical information, a detailed knowledge of the electro-optic modulator's characteristics is necessary.

Traditionally, electro-optic modulator characterization has primarily been done one of two ways. The first and most prevalent method for characterizing electro-optic modulators has been to utilize existing RF sources and receivers with the electro-optic modulator (and a calibrated photodetector) between. The source may be one or more signal generators and the receiver a spectrum analyzer or RF power meter. Alternatively, the source and receiver may come from a single instrument such as a conventional vector network analyzer. In both configurations, the electro-optic modulator maps the electrical signal into the optical domain and the photodetector maps the signal back into the electrical domain. This RF centered approach generally works quite well and builds off the strong foundation of electronic test and measurement, but it hinges on a significant weak point. This weak point is the requirement for a broadband, calibrated photodetector. While high frequency photodetectors exist, they are quite expensive and difficult to independently calibrate for high accuracy. In addition, the opto-electronic properties of a high speed photodetector may be quite sensitive to optical power and other factors that may compromise the accuracy of the measurement.

The second most common technique for characterizing electro-optic modulators is optical spectrum analysis. This approach uses an RF signal generator to drive an electro-optic modulator and an optical spectrum analyzer to measure the power transferred from the laser carrier to the modulation sidebands. This approach has been shown to work to very high frequencies without the need for a high speed calibrated photodetector, but it has its own set of drawbacks. Its accuracy depends on the stability of the laser over the duration of the measurement, which may be quite long. The reason that the measurement takes a long time is that the entire optical spectrum must be measured at each frequency point. With a scanning grating optical spectrum analyzer, broadband measurements may take minutes to hours to complete. Add to this the expense of the optical spectrum analyzer, and it is clear that a better approach is required for electro-optic modulator characterization.

The invention provides a novel approach to isolate and use the RF/electrical information encoded into the optical sidebands generated by electro-optic modulators. The invention utilizes techniques to block the optical carrier and isolate the information carrying optical sidebands. The optical sidebands can be used to determine the important RF or electro-optic parameters including the frequency dependent $V_\pi$ of an electro-optic modulator, the chirp of an electro-optic Mach Zehnder modulator, or the reflection (S11) and transmission (S21) of an RF device.

The $V_\pi$ is the key parameter for designers of optical communications systems or any optical system that utilizes an electro-optic modulator to encode electrical information onto an optical carrier. The invention shows how the frequency dependent $V_\pi$ can be determined for the two primary types of electro-optic modulators, phase modulators and intensity modulators. The invention also can be used to measure the frequency dependent chirp parameter of intensity modulators, which is important in designing long-haul communications networks. In addition to providing a means to characterize electro-optic modulators, the invention also can be used to measure all of the frequency dependent RF/electrical parameters of any device that has an electronic interface. This invention is broadly applicable to test and measurement of electronic and electro-optic components and also can be used in RF sensing, in-line RF monitoring, and many other applications. The discussions begins by describing the basic generation and isolation of optical sidebands and how they can be used in a simple, robust, and inexpensive measurement system to characterize the $V_\pi$ of phase modulators and intensity modulators as well as the chirp parameter of intensity modulators. This discussion is followed by a description of an extension of the invention to measure RF device parameters and perform RF test and measurement.

Prior art RF test and measurement equipment requires high frequency RF components to process high frequency RF signals. The current invention uses only low speed, low cost photodetectors to process high frequency RF signals. This significantly reduces the cost of the system and results in increased reliability.

Prior art electro-optic modulator characterization techniques either used high frequency photodetectors and RF systems or optical spectrum analyzers. The current invention improves on the high frequency RF system approach because it eliminates the need for the high frequency photodetectors and high frequency RF components, using only low speed, low cost photodetectors to process high frequency RF signals. The current invention is similar to the optical spectrum analyzer approach to characterizing electro-optic modulators in that it uses the magnitudes of the optical sidebands to determine the modulator characteristics. However, the invention is unique and improves upon the prior art because the invention does this without the need for an expensive optical spectrum analyzer. The invention collects all of the useful spectral information in a single data point, allowing measurements 1000× faster than scanning optical spectrum analyzer based approaches.

These and further and other objects and features of the invention are apparent in the disclosure, which includes the above and ongoing written specification, with the claims and the drawings.

DETAILED DESCRIPTION

The invention provides a technique to isolate the electronic information stored in the optical sidebands generated by electro-optic modulation that utilizes suppression of the optical carrier.

When light at a particular frequency (optical carrier frequency, Ω) such as that produced by a laser is incident on an electro-optic modulator that is driven by an RF signal at a frequency, ω, optical sidebands are produced symmetrically about the optical carrier frequency. These optical sidebands contain all of the information about the RF signal including its frequency, amplitude and phase.

Figure 1:
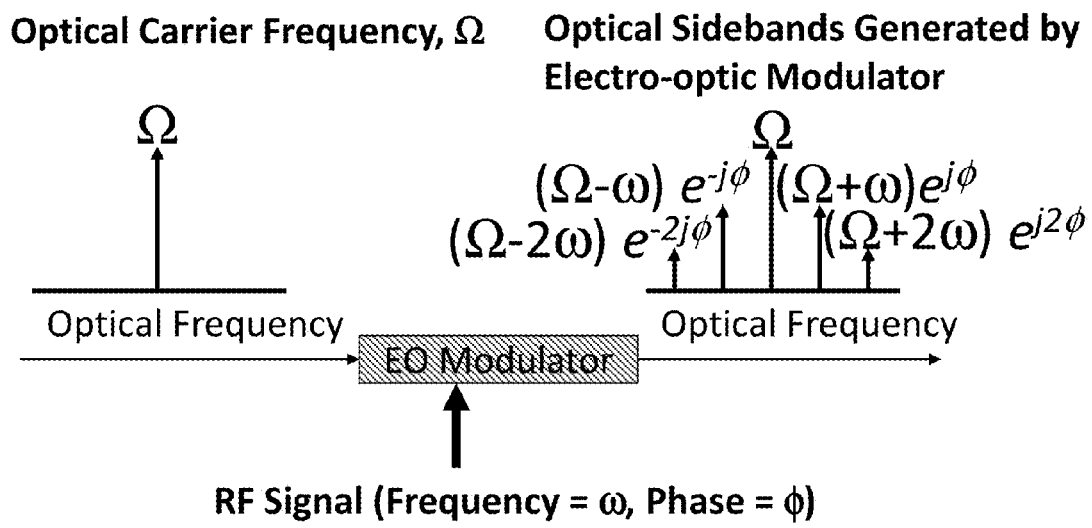
FIG. 1 shows when an optical carrier at frequency $\Omega$ passes through an electro-optic modulator that is driven by an RF signal with frequency, ω, and phase, φ, optical sidebands are generated around an optical carrier at Ω±nω and each optical sideband contains the RF phase information.
Figure 2:
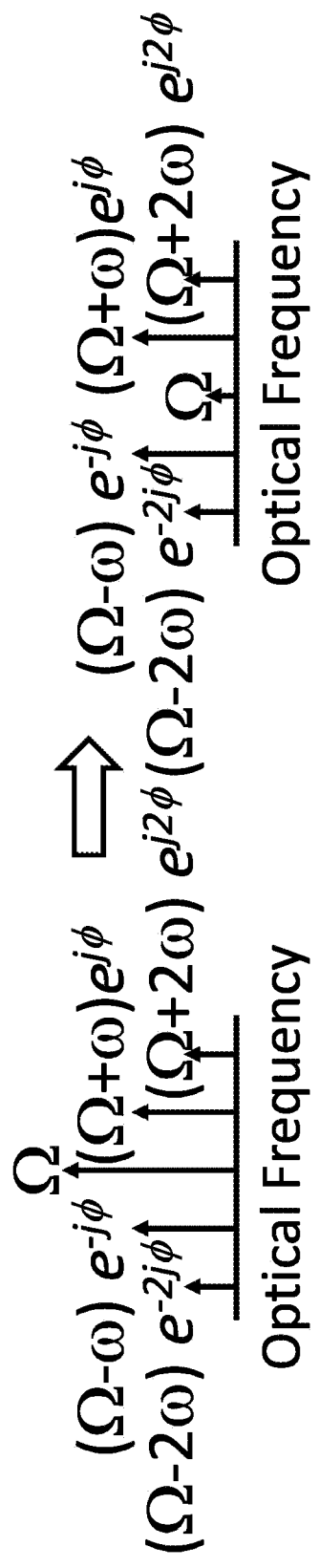
FIG. 2 shows that optical carrier suppression reduces the amplitude of the optical carrier so that the optical sidebands have the largest amplitude.

FIG. 1 shows that when an optical carrier at frequency Ω passes through an electro-optic modulator that is driven by an RF signal with frequency, ω, and phase, φ, optical sidebands are generated around an optical carrier at Ω±nω and each optical sideband contains the RF phase information.

Calculations illustrating the process of optical sideband generation in an electro-optic phase modulator are provided herein.

Although the sidebands at Ω±nω contain all of the information about the RF signal, they generally have much lower amplitude than the strong optical carrier at SI This makes it difficult to extract the useful information contained in the optical sidebands. High speed photodetectors can be used to reconstruct the RF signal's amplitude and phase from the optical sidebands but photodetectors are expensive, sensitive, and do not operate at arbitrarily high RF frequency.

Figure 12:
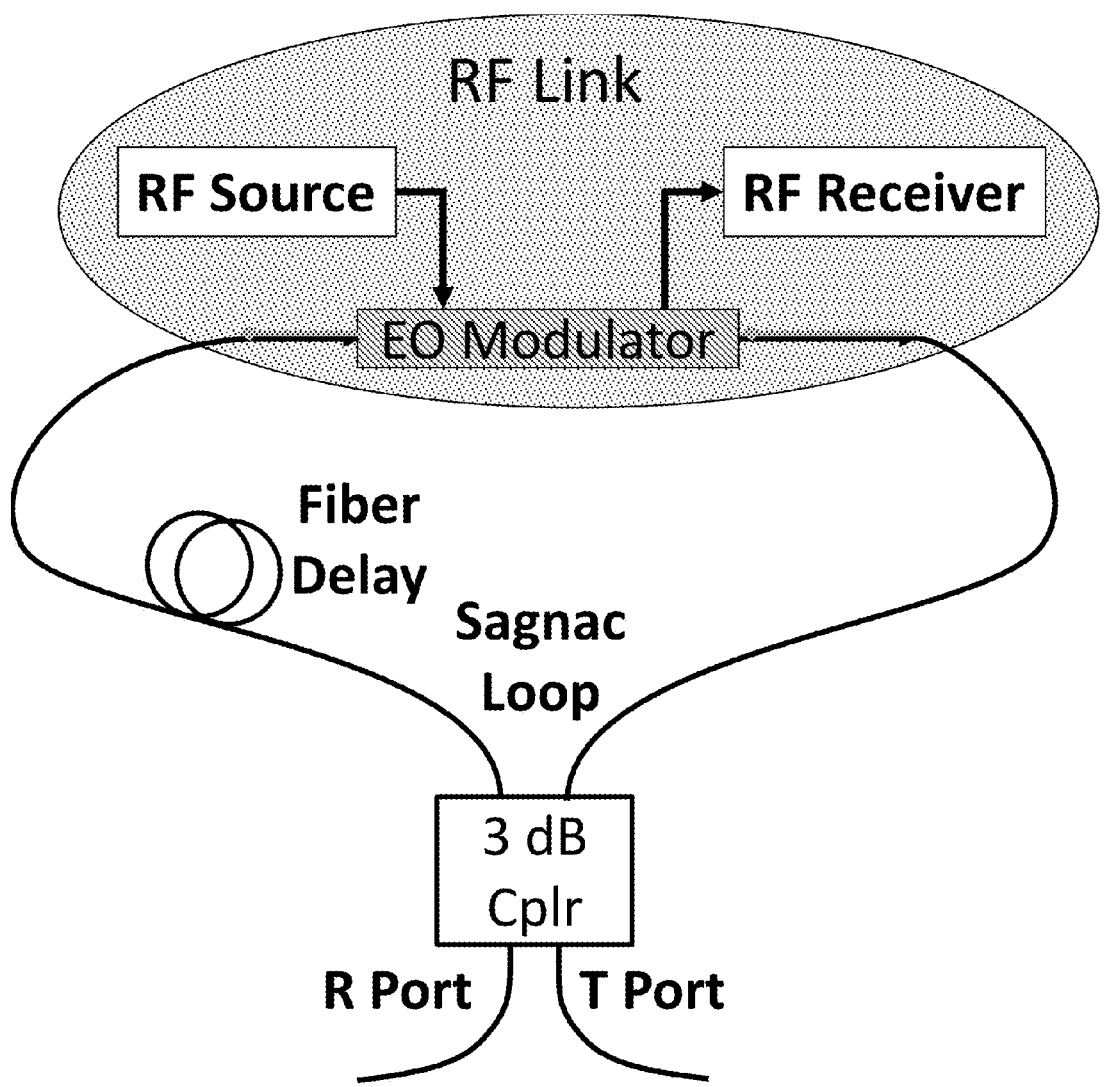
FIG. 12 shows in-line, non-blocking RF test and measurement illustrated with the SaLT measurement.

FIG. 12 shows how optical carrier suppression reduces the amplitude of the optical carrier so that the optical sidebands have the largest amplitude.

What makes this invention unique is the use of optical carrier suppression to gain direct access to the RF information stored in the optical sidebands. By suppressing the optical carrier, we can reduce its amplitude so that the optical sidebands have the largest amplitude. This allows us to access the RF information in the optical sidebands without the need for a high speed photodetector. In fact, all of the applications described in the following section can be implemented using low cost, low speed photodetectors or optical power meters, devices that only measure total optical power. This allows the invention to be implemented in a cost effective manner over a wide range of optical wavelengths and up to arbitrarily high RF frequencies. There are a number of ways to suppress the optical carrier including optical notch filters and this invention includes the use of those optical carrier suppression techniques. However, these typically only work at specific optical carrier frequencies and so we describe one of the preferred embodiments of the invention that uses a Sagnac loop interferometer to provide broadband, self-referencing optical carrier suppression. The Sagnac loop carrier suppression technique is used as an example throughout the rest of this specification.

The invention provides a technique to measure the electro-optic characteristics of an electro-optic phase modulator that utilizes suppression of the optical carrier.

Electro-Optic Phase Modulator Characterization

Figure 3:
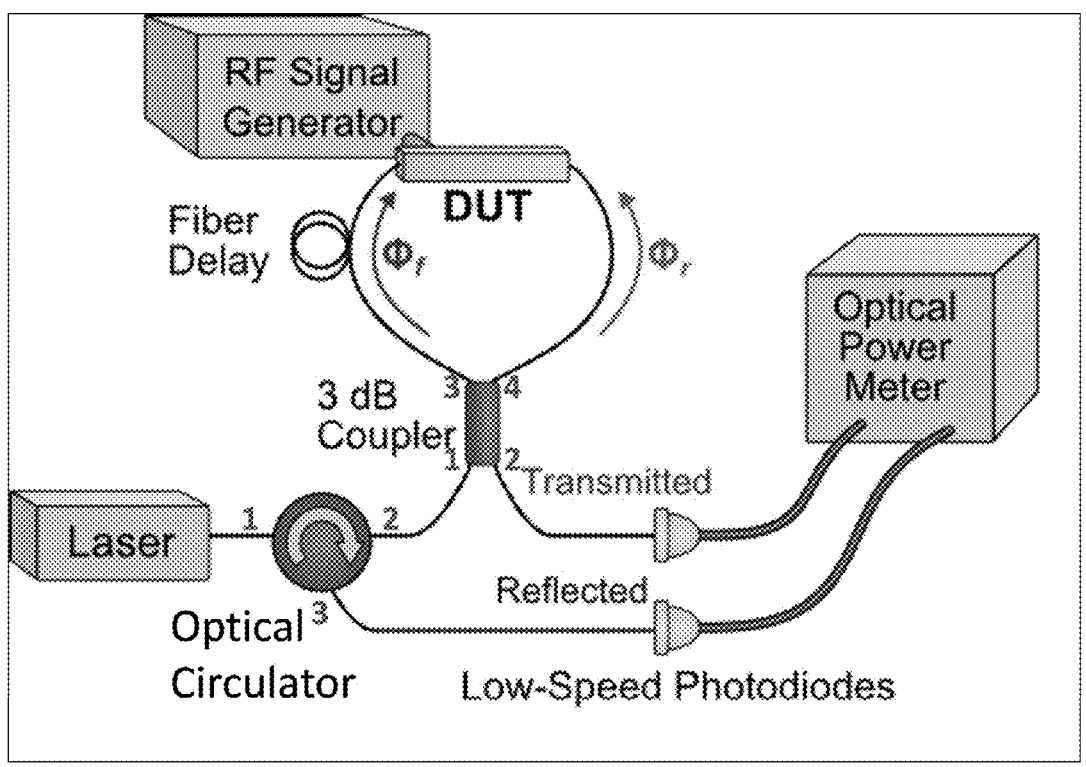
FIG. 3 shows a Sagnac loop measurement system.

The first use of this invention is to apply optical carrier suppression techniques to measure the parameters of an electro-optic phase modulator. One of the preferred embodiments of the invention uses a Sagnac loop interferometer to isolate the optical sidebands generated by an electro-optic phase modulator. Sagnac loop interferometers have many important and useful features. As the name suggests, the interferometer is a closed loop in which the light that enters the interferometer and is split into its two arms travels exactly the same path, but in opposite directions. When a Sagnac loop interferometer is realized in optical fiber the common path feature means that the interferometer requires no bias feedback to lock onto its operating point and it is also insensitive to environmental fluctuations such as vibration and temperature. In the present invention, as shown, for example, in FIG. 3, light travels through port 1 of an optical circulator and enters the Sagnac loop through port 1 of an optical 3 dB coupler (a device that splits the input light equally). The light input to port 1 is split equally to ports 3 and 4 of the optical 3 dB coupler and the separated light travels opposite directions through the interferometer. In the interferometer, offset from the center by a fiber delay, is an electro-optic phase modulator. The light traveling both forward and backward through the Sagnac loop, passes through the electro-optic phase modulator and returns to ports 3 and 4 of the coupler. If the nature of the two paths through the Sagnac loop is exactly matched, interference between light that travels the two paths results in maximum light intensity exiting port 1 of the optical 3 dB coupler and minimum intensity exiting port 2. Since the light enters port 1, we call any light that exits port 1 "reflected" and any light that exits port 2 "transmitted". The reflected light next enters port 2 of the optical circulator and is directed out port 3 of the circulator. Low speed, low cost optical detectors collect the light intensity from port 3 of the circulator and port 2 of the optical 3 dB coupler. Borrowing from the terminology introduced above, these photodetectors measure the reflected and transmitted light respectively. An illustration of the Sagnac loop measurement system is shown in FIG. 3. This is called the Sagnac Loop Technique or SaLT.

FIG. 3 shows a Sagnac loop measurement system.

One of the most desirable features of the Sagnac loop is its self-biasing nature. When there is no asymmetry in the two paths through the loop, the light intensity on the reflected port (R Port—FIG. 11) is maximized and the transmitted port is minimized. However, when the light on the two paths experiences different effects, this natural biasing is disrupted and light exits the transmitted port (T Port—FIG. 11). The Sagnac effect is used to sense rotation in gyroscopes among other applications. The present invention also takes advantage of the Sagnac effect, but in a different way. Typical high frequency electro-optic modulators utilize traveling wave electrode structures that try to match the velocity of the microwave signal to the velocity of the optical carrier that is being modulated. This results in maximally efficient modulation at high frequencies for light that is traveling in the same direction as the microwave signal. This is the so-called velocity matched direction. Conversely, light that is propagating in a direction opposite to the microwave signal is only very weakly modulated due to significant velocity mismatch. When an electro-optic phase modulator is placed in a Sagnac loop and driven with a microwave signal by an RF signal generator, the light that is traveling forward through the electro-optic modulator (in the same direction as the microwave signal) is strongly modulated, while the light that is traveling in the opposite direction is only weakly modulated. The imbalance in the modulation of the forward and backward traveling light results in light intensity on the transmitted port of the Sagnac loop that is proportional to the modulation efficiency. Sweeping the RF frequency using the RF signal generator generates RF frequency dependent light intensity on the transmitted port. This can be used to extract the RF frequency dependent performance of an electro-optic modulator. A full derivation of the transmitted and reflected optical power is provided herein.

Figure 4:
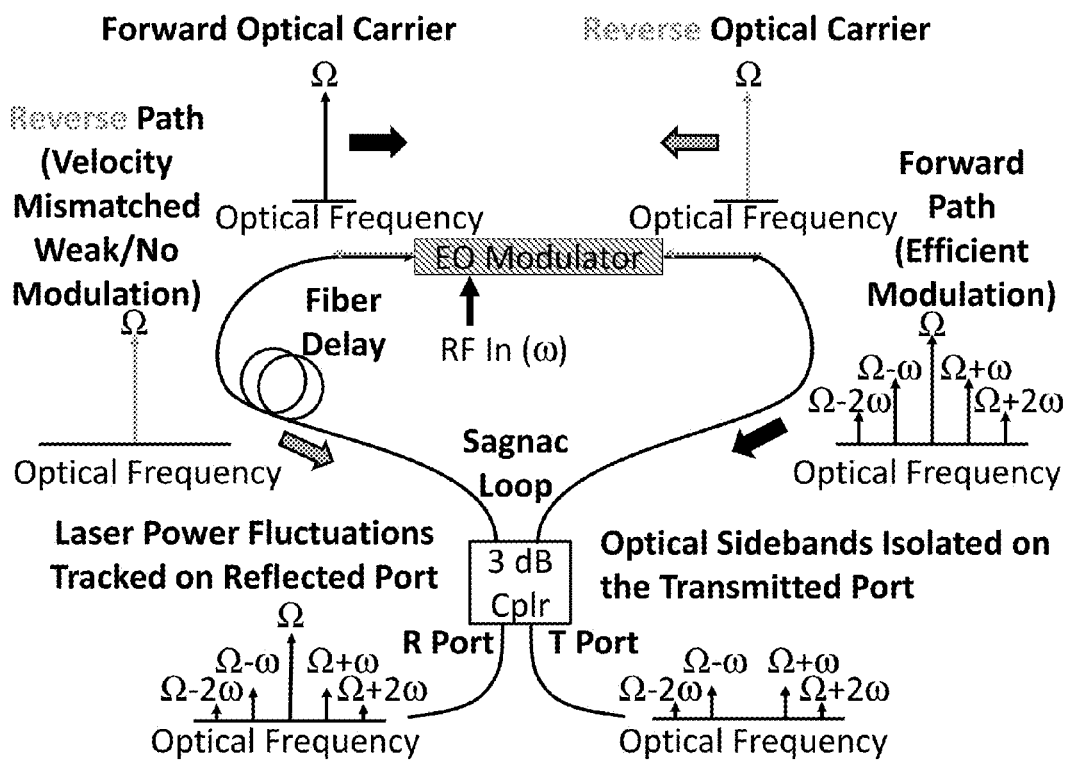
FIG. 4 shows electro-optic modulator characterization using the Sagnac Loop Technique (SaLT).

A simplified illustration of the optical carrier suppression function of the Sagnac loop is shown in FIG. 4.

FIG. 4 shows electro-optic modulator characterization using the Sagnac Loop Technique (SaLT). The common features of the forward and reverse paths are suppressed on the Transmitted port, resulting in optical carrier suppression on the Transmitted port.

The calculations provided herein and the illustration in FIG. 4 demonstrate the key feature of the Sagnac loop interferometer; the transmitted port suppresses the common features of the two paths, namely the optical carrier. The important information about the RF signal applied to the phase modulator and the phase modulator's own properties are contained in the optical sidebands. The optical carrier simply masks this information with its dominant intensity and it is therefore quite useful to suppress the optical carrier. It is important to note that the Sagnac loop interferometer is not the only way to block the optical carrier, this can also be achieved using optical filters or other techniques that are readily apparent to those skilled in the art.

Once the optical sidebands generated by an electro-optic phase modulator have been isolated from the carrier, the integrated optical power on the transmitted port can be used to determine the RF frequency dependent modulator $V_\pi$. This is one of the key performance metrics of an electro-optic modulator.

Benefits
    a) It is important to note that all that is required for this measurement, in addition to a method for removing the optical carrier such as the Sagnac loop described above and illustrated in FIG. 3.
    b) FIG. 3 is a calibrated microwave signal generator. Conversely, an electro-optic modulator with known (calibrated) $V_\pi$ can be used to calibrate a signal generator.
    c) One significant advantage that the Sagnac loop provides as compared to other methods for removing the optical carrier is that the two output ports of the Sagnac loop conserve optical power. Therefore, optical power fluctuations that might be caused by an unstable laser and would cause considerable errors in an optical spectrum analysis based calibration scheme are easily corrected by normalizing the transmitted power to the overall sum of the reflected and transmitted powers. This is a considerable advantage of the Sagnac loop approach and we have demonstrated that the technique is immune to optical power fluctuations greater than 25 dB.
    d) Other advantages of the Sagnac loop approach that set it apart from the prior art (VNA with calibrated photodetector or optical spectrum analysis) include the ease of measuring electro-optic modulators that operate at unconventional wavelengths. Calibrated photodetectors are typically only calibrated at particular wavelengths and different photodetectors may be required at each wavelength of interest. Even if a photodetector exists at the desired wavelength, it may be quite expensive and require expensive calibration. Likewise, optical spectrum analyzers typically only work over a limited range of wavelengths and broadband optical spectrum analyzers suffer from poor resolution. In contrast, the Sagnac loop approach uses only low speed photodetectors or power sensors. These detectors tend to be low cost and the only performance requirement is that they have a linear response in the optical power range of the measurement. Moreover, optical circulators and 50:50 couplers are readily commercially available for wavelengths ranging from 650 nm to >2000 nm. This means that the Sagnac loop setup can be economically replicated at any desired wavelength in contrast to prior approaches.

The invention provides a technique to measure the electro-optic characteristics of an electro-optic Mach-Zehnder intensity modulator that utilizes suppression of the optical carrier.

Electro-Optic Mach Zehnder (Intensity) Modulator Characterization

The second use of the invention is to apply optical carrier suppression techniques to characterize the performance of an electro-optic Mach Zehnder modulator. The previous section described how a measurement setup based on a Sagnac loop can be used to isolate the optical sidebands generated by an electro-optic phase modulator from the optical carrier. Mach Zehnder style intensity modulators are the other most common type of electro-optic modulator. Intensity modulators of various types are commonly used in optical communications systems. This section will describe how the techniques of this invention (optical carrier suppression and optical sideband processing) can be applied to determine the $V_\pi$ of a Mach Zehnder modulator. In claim 4 we show how the technique can be used to determine the Mach Zehnder modulator's chirp.

While the previous sections have highlighted the use of the Sagnac loop to perform carrier suppression and thus isolate the optical sidebands so that their properties are more easily measured, the invention is broadly applicable to any technique whereby the optical carrier is suppressed and the information that is encoded in the optical sidebands is used to determine the properties of an electro-optic modulator or RF/electronic device. The initial discussion of Mach Zehnder modulator characterization will highlight a different embodiment of this invention that uses the same optical sideband isolation approach, but does not involve the use of a Sagnac loop. Typical Mach Zehnder modulators consist of a traveling wave RF electrode for the RF signal, and a separate capacitive electrode for DC tuning of the Mach Zehnder interferometer bias. As the DC bias of the Mach Zehnder modulator is varied, the light traveling in the two arms can vary from being perfectly in phase (constructive interference, maximum transmission of the optical carrier) to perfectly out of phase (destructive interference, minimum transmission of the optical carrier). The optical carrier has been highlighted here because this invention is based on the use of techniques that suppress the optical carrier and thereby isolate the optical sidebands. When a Mach Zehnder modulator is biased for minimum carrier transmission using the DC bias electrode and an RF signal is applied to the RF electrode, the optical carrier is minimized, but the optical sidebands are not. The reason for this is that the optical sidebands may have an optical phase that differs from the optical carrier so that when the optical carrier is minimized, some optical sidebands are maximized. A full derivation is provided herein.

Figure 5:
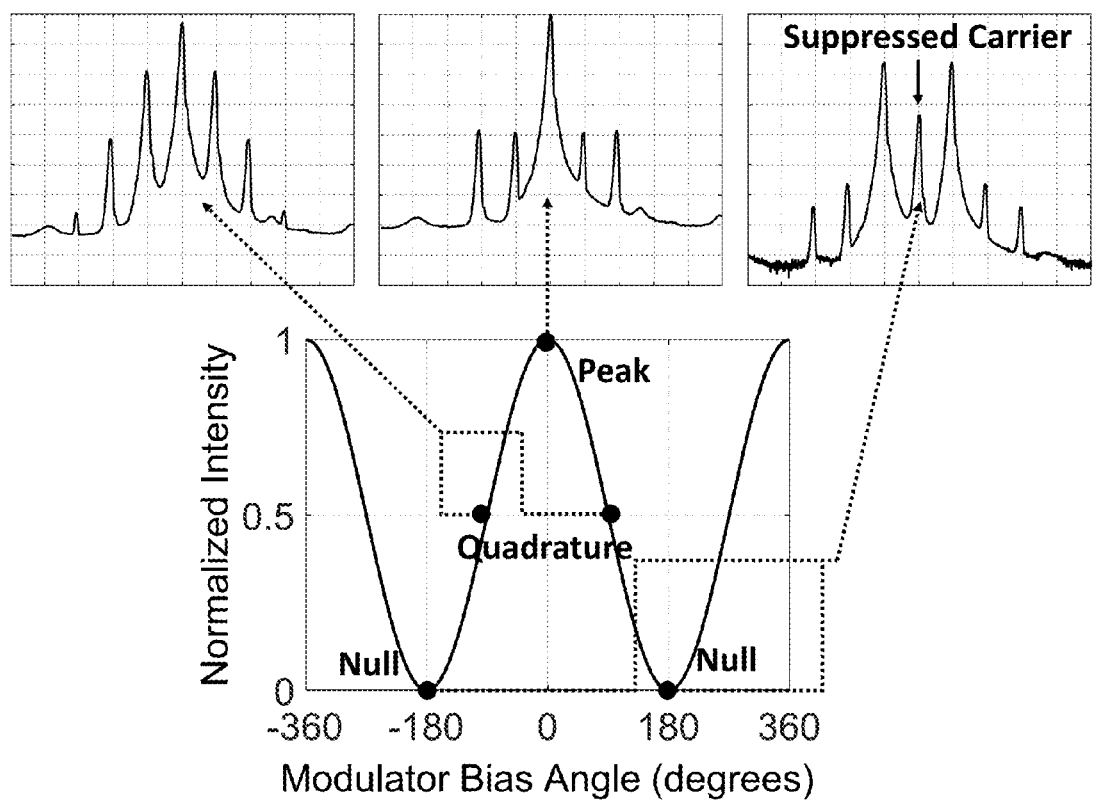
FIG. 5 shows the optical spectrum generated by an electro-optic Mach Zehnder modulator at various DC bias points.

FIG. 5 shows the optical spectra of a Mach Zehnder modulator at three different bias points.

The optical power out of the Mach Zehnder modulator when it is biased at null can be directly related to the modulator's $V_\pi$ in a similar manner to the example of the Phase Modulator in the Sagnac loop given above. Holding the modulator at null can be accomplished using a variety of methods including employing a commercial bias controller. We have found that a convenient method is not to try to hold the exact bias minimum, but instead to dynamically scan the region around the minimum and then pick out the data at the minimum from each scan.

FIG. 5 shows optical spectra generated by an electro-optic Mach Zehnder modulator at various DC bias points. The top row of the figure show the optical spectra for Quadrature, Peak and Null bias points from left to right. The bottom row of the figure shows the optical carrier intensity as a function of DC bias angle. At null bias, the optical carrier is suppressed, but the optical sidebands are not.

Benefits

The technique described above is a fast and reliable method for measuring the $V_\pi$ of a Mach Zehnder intensity modulator. Like the phase modulator characterization technique described above, it only requires low speed photodetectors for optical power measurements and is easily extended to any wavelength since the Mach Zehnder itself provides the carrier suppression functionality. The only requirement for accurate measurements is sufficient carrier suppression to effectively isolate the optical sidebands. Typical commercially available modulators with an optical extinction ratio of 20 dB are easily measured using this technique.

The invention provides a technique to measure the chirp parameter of an electro-optic Mach-Zehnder intensity modulator that utilizes suppression of the optical carrier.

Measurement of Mach Zehnder Modulator Chirp

The third use of the invention technique applies optical carrier suppression and multiple Mach Zehnder modulator bias points to measure the chirp of a Mach Zehnder modulator. Mach Zehnder modulators are essentially two phase modulators in parallel driven by one or more RF electrodes. The three most common types of $LiNbO_3$ Mach Zehnder modulators are the X-cut and Z-cut single drive modulators and the Z-cut dual drive modulators. The two arms of the X-cut single drive modulator are nominally driven by the same amplitude RF signal, but with a $\pi$ RF phase shift. The two arms of the Z-cut single drive modulator are driven with different amplitude RF signals and a $\pi$ RF phase shift. Finally, the two arms of the Z-cut dual drive modulator can each have a unique amplitude and phase because separate RF signals can be applied to each arm. Mach Zehnder modulators are characterized by what is known as their chirp. The chirp is a measure of the drive imbalance between the two arms. If the amplitude of the RF drive in one arm is $m_1$ and the amplitude of the RF drive in the other arm is $m_2$, then the chirp parameter is given by $(m_1-m_2)/(m_1+m_2)$. As an example, the X-cut single drive modulator has a nominal chirp of zero because both arms are driven with equal magnitude. The opposite extreme is the case of a dual drive modulator in which a signal is applied to only one arm. In that case, the chirp is equal to 1. The chirp parameter is important in long-haul optical communications because fiber dispersion can be compensated by modulator chirp.

The chirp parameter can be measured using a variety of techniques including RF frequency domain analysis and optical spectrum analysis. Of these two, the optical spectrum analysis approach is generally preferable because it allows an RF frequency resolved determination of the chirp while the RF frequency domain analysis provides only an average chirp. The optical spectrum analysis method for determining the chirp is based on a comparison of the optical sideband intensities at two different modulator bias points. The two most obvious DC bias points to use are the peak (maximum transmission) and the null (minimum transmission) because they provide the largest signal contrast.

Figure 6:
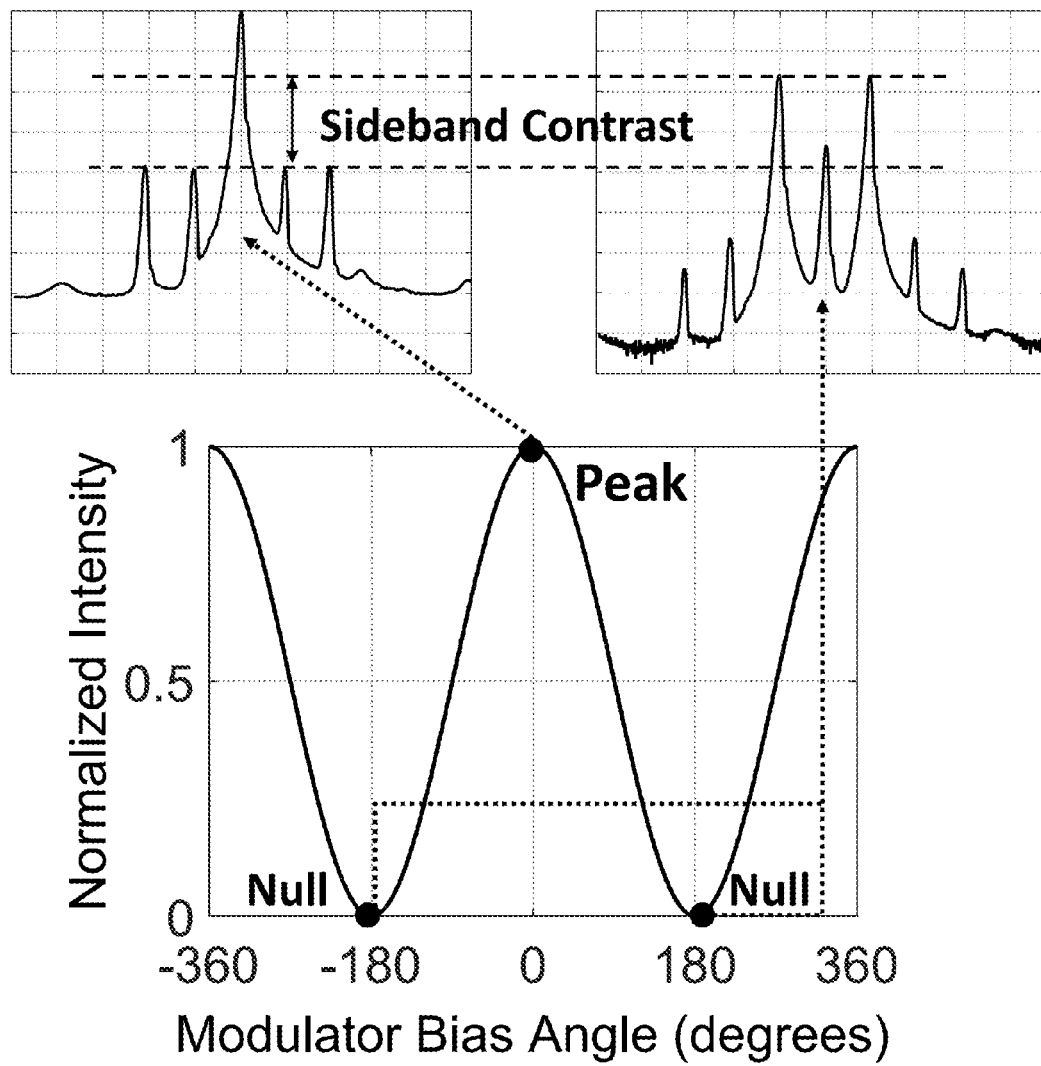
FIG. 6 shows at the top, the optical spectrum of the optical sidebands of a representative X-cut Mach Zehnder Intensity Modulator at peak bias (left side) and null bias (right side) and at the bottom the normalized optical carrier amplitude vs. modulator bias angle.

FIG. 6 shows at the top, the optical spectra of the optical sidebands generated by a representative X-cut Mach Zehnder Intensity Modulator at peak bias (left side) and null bias (right side). The difference in the sideband amplitude is related to the chirp. At the bottom of the figure is the normalized optical carrier amplitude vs. modulator bias angle.

The X-cut Mach Zehnder intensity modulator was not inside a Sagnac loop interferometer when the optical spectra shown in FIG. 6 were measured. Clearly, the optical carrier is quite large at peak bias. Just as in the discussion of the phase modulator above, the key point here is that the important information is contained in the optical sidebands and optical carrier suppression is necessary to access this information, particularly at peak bias. We can see that the present invention's use of optical carrier suppression techniques can be applied to extracting the Mach Zehnder modulator chirp information that is contained in the optical sidebands. When a Mach Zehnder modulator is the DUT in FIG. 3 and FIG. 7, the Sagnac loop still suppresses the optical carrier, providing direct access to the optical sidebands. While the optical sidebands are dominant at null bias, the Sagnac loop provides the optical carrier suppression required to isolate the optical sidebands at peak bias. A full derivation of the Transmitted and Reflected intensities for a Mach Zehnder modulator in a Sagnac loop is provided herein.

The invention provides a technique to measure the RF reflection ($S_{11}$) and transmission ($S_{21}$) amplitude and phase of active and passive RF components using electro-optic modulators and the previous new techniques.

Optical Measurement of RF Device Parameters

The present invention is not limited to measuring the performance of electro-optic modulators. The isolation of the optical sidebands generated by an electro-optic modulator can also be applied to measure the key parameters of any RF device including the RF transmission ($S_{21}$) and reflection ($S_{11}$) both amplitude and phase. Essentially, any device that generates, transmits or receives an RF/electrical signal can be completely measured using these optical signal processing techniques, providing an extremely versatile and powerful measurement system. The basic structure of the invention is the same as that shown in FIG. 3, but with the addition of a second electro-optic modulator. The extension of the invention to measure all RF parameters is shown in FIG. 7.

Figure 7:
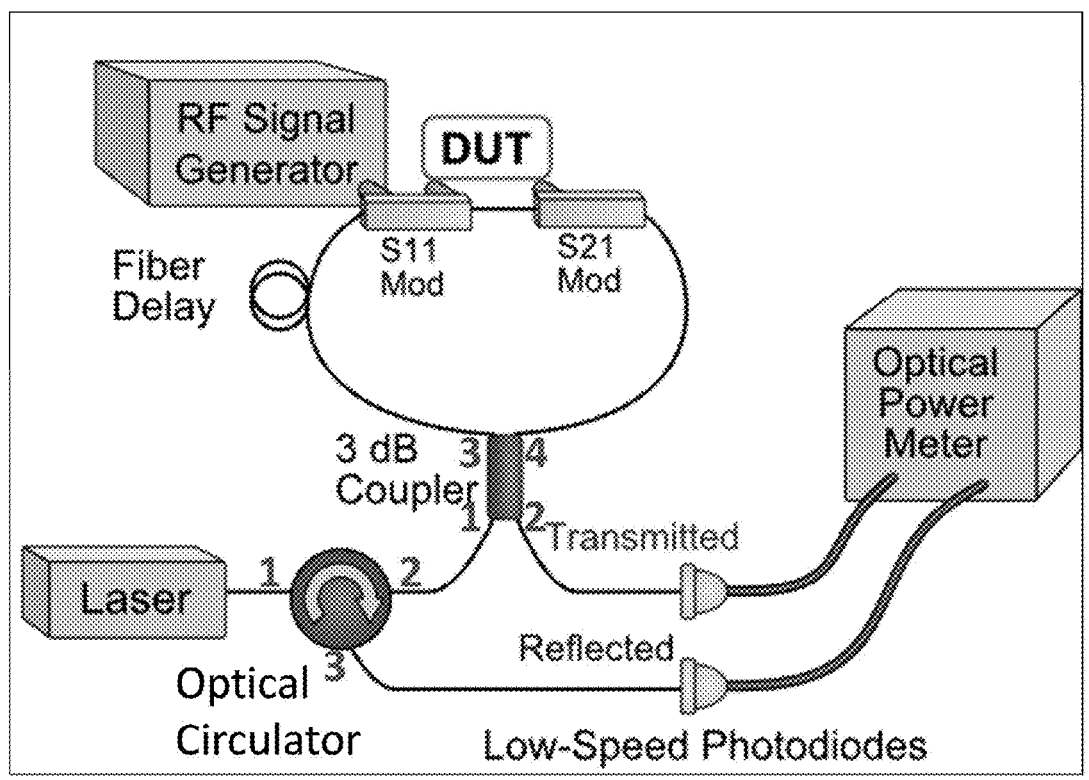
FIG. 7 shows the Referenced Sagnac Loop Technique measurement setup. The S11 modulator is used to sense reflections off the Device Under Test (DUT), and the S21 modulator is used to measure the transmission of the DUT.

FIG. 7 shows the Referenced Sagnac Loop Technique measurement setup. The $S_{11}$ modulator is used to sense reflections off the DUT, and the $S_{21}$ modulator is used to measure the transmission of the DUT.

While the electro-optic modulator was the Device Under Test (DUT) in FIG. 7, the two electro-optic modulators are used to measure the performance of an RF DUT. This measurement is called the Referenced Sagnac Loop Technique (ReSaLT), because like an RF vector network analyzer DUT performance is measured relative to a baseline measurement without the DUT. The electro-optic modulators shown in FIG. 7 are typically phase modulators, and the basic properties of the invention remain the same. As the frequency of the RF signal is varied by the RF signal generator, the phase modulators generate optical sidebands that contain all of the properties of the RF signal, both amplitude and phase. The Sagnac loop structure serves multiple purposes including optical carrier suppression to isolate the optical sidebands. This optical carrier suppression and the isolation of the optical sidebands provides the same benefit that it did for electro-optic modulator characterization. Characterizing RF DUT performance, however, also utilizes another feature of the Sagnac loop, namely the presence of counter-propagating optical signals. This feature is key to the measurement of RF reflections ($S_{11}$).

Measurement of RF Reflection ($S_{11}$)

Figure 8:
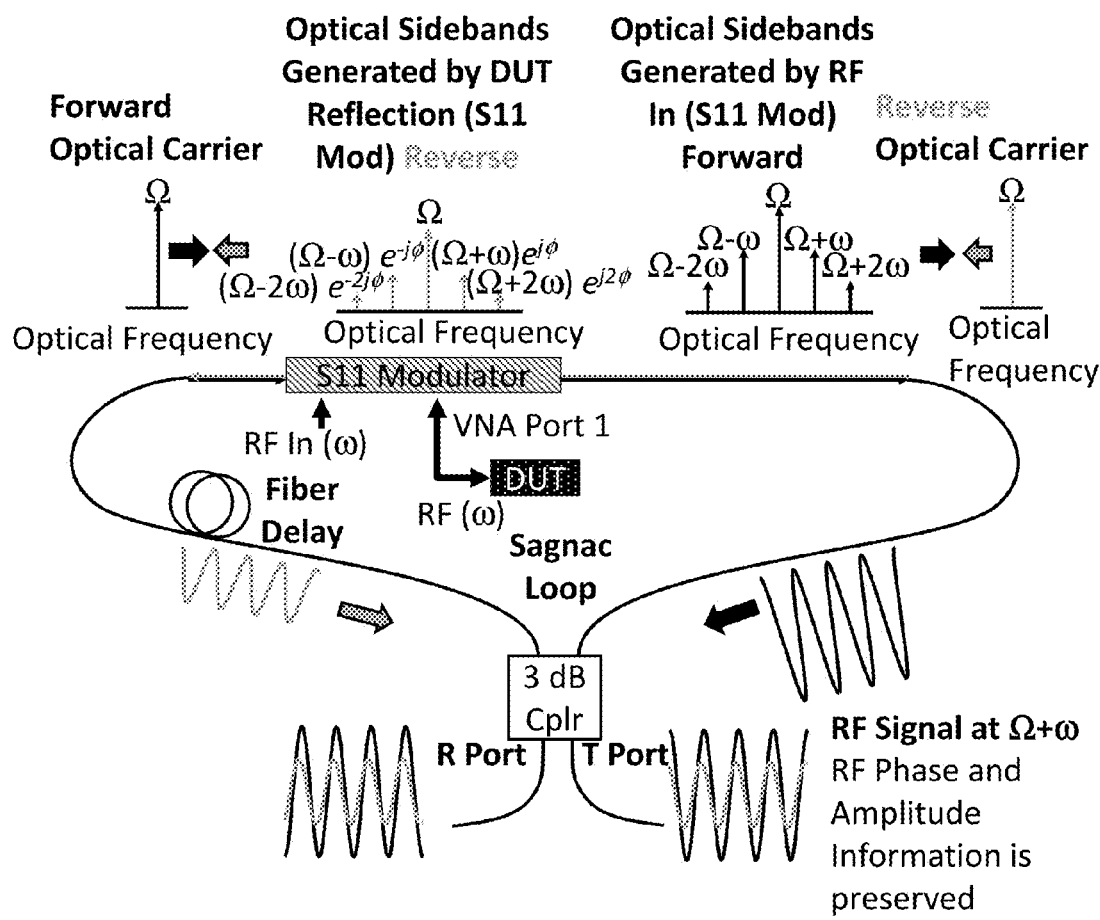
FIG. 8 shows measurement of Device Under Test (DUT) reflections (S11) using the invention. The figure illustrates how the amplitude and phase of the RF signals are imprinted on the forward and reverse propagating optical carriers. These signals mix in the 3 dB Coupler enabling full phase reconstruction of the RF signal.

In the original Sagnac Loop Technique (SaLT) for measuring the performance of electro-optic modulators, we were generally concerned with RF signals that propagated forward through the electro-optic modulator. In the ReSaLT measurement, reflections off the DUT result in an RF signal that propagates backward through the $S_{11}$ electro-optic modulator. This reflected RF signal is the key to measuring the DUT $S_{11}$ and the ability to sense this RF signal is made possible by the fact that it is velocity matched with the counter-propagating optical signal in the Sagnac loop. FIG. 8 illustrates the $S_{11}$ measurement using this invention. FIG. 8 shows measurement of Device Under Test (DUT) reflections ($S_{11}$) using the invention. The figure illustrates how the amplitude and phase of the RF signals are imprinted on the forward and reverse propagating optical carriers. These signals mix in the 3 dB Coupler, enabling full phase reconstruction of the RF signal.

This is an important feature of the invention that is not possible with other photonic techniques for measuring RF parameters. The reflected RF signal amplitude and phase are transferred to this counter-propagating optical signal allowing both to be extracted from the measured data. The transmitted intensity contains a term that depends primarily on this reflected RF signal and it can be separated from the other terms through digital filtering techniques. A full derivation of the ReSaLT $S_{11}$ measurement is provided herein.

Measurement of RF Transmission ($S_{21}$)

Figure 9:
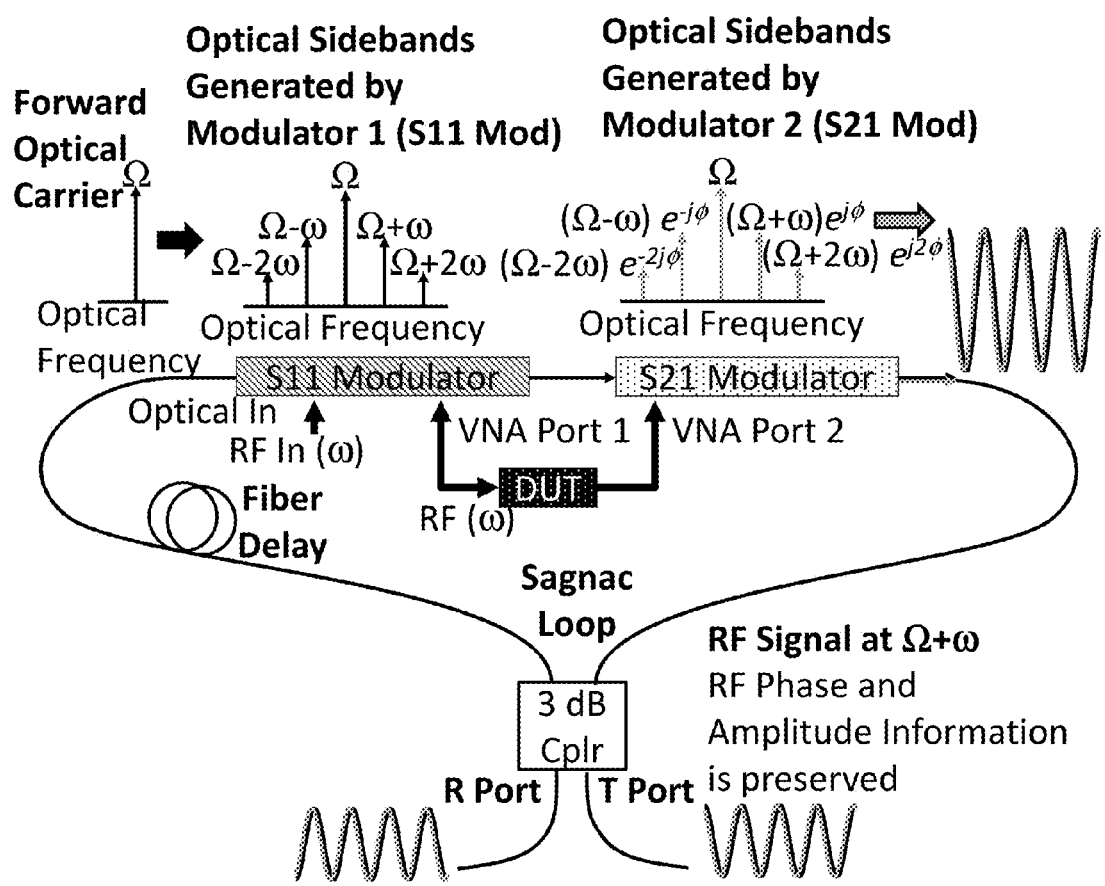
FIG. 9 shows measurement of Device Under Test (DUT) Transmission (S21) using the invention. The figure illustrates how the amplitude and phase of the RF signals passing through the S11 Modulator and the S21 Modulator are imprinted onto the forward propagating optical carrier.

In addition to reflecting off the DUT, RF signals also pass through, and are modified by, the DUT. This may result in a decrease (loss) or increase (gain) in RF signal amplitude as well as a change in RF phase. A key feature of the ReSaLT invention is that there are two paths connecting the $S_{11}$ and the $S_{21}$ electro-optic modulators: an RF path and an optical path. The RF/electrical path includes the RF DUT while the optical path consists of the optical fiber between the $S_{11}$ and the $S_{21}$ electro-optic modulators. The optical path allows the transport of the RF signal, free of RF frequency dependent loss, dispersion or phase variations, between the two electro-optic modulators, creating an optically carried RF local oscillator. The RF path, in contrast may experience frequency dependent loss or gain as well as RF phase variations and all of this information can be extracted through the interference with the optically carried RF local oscillator. The optically carried RF local oscillator is a key feature of this invention. A variation of the invention includes an optically carried RF local oscillator that is at a different RF frequency than the RF frequency that passes through the DUT. This will result in Transmitted port intensity variation at the difference frequency between the optically carried RF local oscillator and the RF frequency that passes through the DUT. This difference frequency preserves the amplitude and phase information and may still be measured using low speed, low cost photodetectors. FIG. 9 shows an illustration of the $S_{21}$ measurement using the invention. FIG. 9 shows measurement of Device Under Test (DUT) Transmission ($S_{21}$) using the invention. The figure illustrates how the amplitude and phase of the RF signals passing through the $S_{11}$ Modulator and the $S_{21}$ Modulator are imprinted onto the forward propagating optical carrier.

A full derivation of the ReSaLT $S_{21}$ measurement is provided herein.

The invention proves a technique to measure the RF spectrum (Spectrum Analyzer) that uses electro-optic modulators and the previous new techniques.

RF Spectrum Analysis

The discussion of the invention so far has focused on the use of an RF signal generator to measure the RF frequency dependent characteristics of electro-optic modulators and RF devices. If we consider the expression for the transmitted intensity derived for a single phase modulator in a Sagnac loop we see that it depends on the RF frequency, ω, and various times including the fiber delay, T. Up to this point, we have focused on sweeping a known RF frequency while keeping the various delay times fixed. If we instead sweep the delay times we can use the Sagnac loop structure to detect the presence of unknown RF frequencies. This is the basis of an RF spectrum analyzer. An illustration of this use of the invention is shown in FIG. 10.

Figure 10:
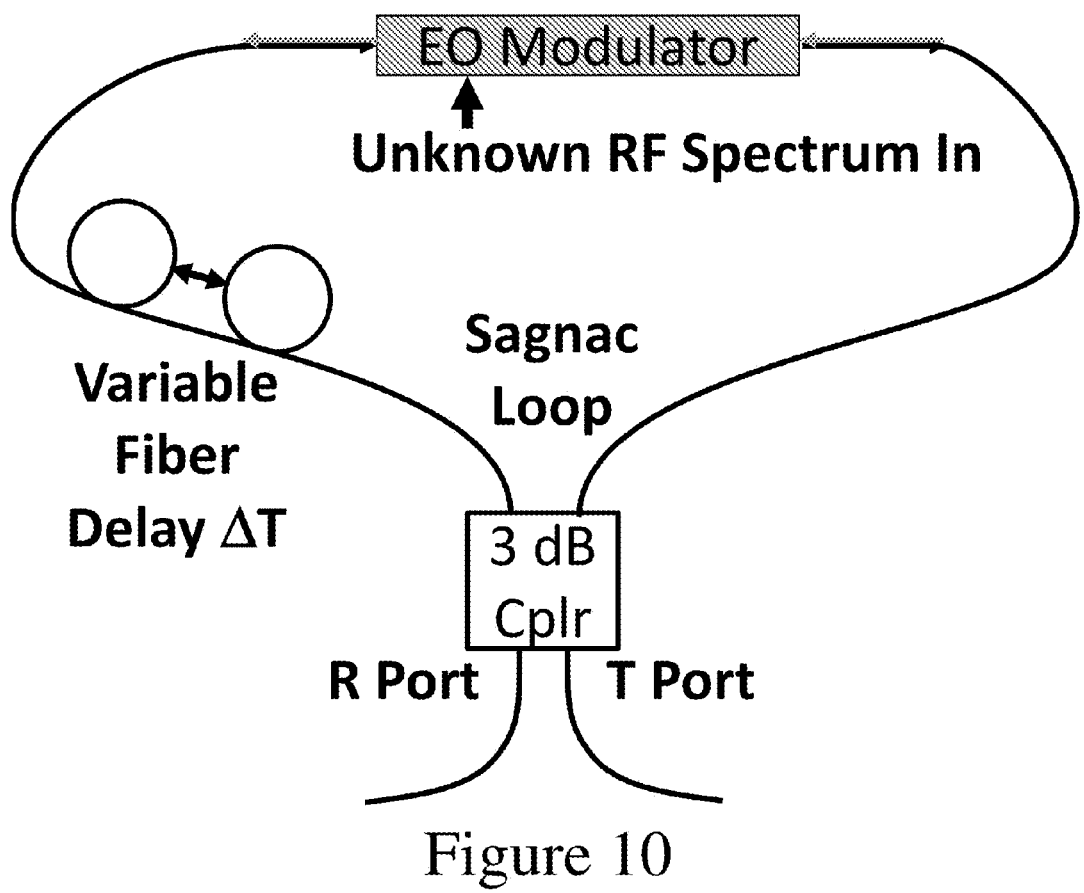
FIG. 10 shows an illustration of using the invention to create an RF Spectrum Analyzer.

FIG. 10 shows an illustration of using the invention to create an RF Spectrum Analyzer. In the RF spectrum analyzer preferred embodiment, the unknown RF signal is applied to the RF port of an electro-optic modulator in a Sagnac loop. If the fiber delay is swept by using a variable optical delay line or other means, the Transmitted optical will oscillate with a period determined by the unknown RF spectral components. Fourier transforming the transmitted optical power reveals the RF spectral components. The advantages of this approach include extremely broadband RF spectral analysis to well beyond 100 GHz.

The invention provides a technique for remote RF sensing that uses electro-optic modulators and the previous new techniques.

Remote RF Sensing and Measurement

The invention is broadly applicable to the sensing and measurement of RF signals through the use of electro-optic modulators and optical signal processing techniques. The electro-optic phase modulators and the Sagnac loop that are used in the SaLT preferred embodiment do not require any power, bias feedback or electronic control. This makes them ideal for remote sensing and measurement applications. Because the invention is fully optical, the optical carrier can be sent out to the remote site and the RF signal amplitude can be mapped to the optical domain and transported back via low loss optical fiber. A key advantage of this technique for RF sensing over long distances is that changes in the RF amplitude (and/or phase) are detected as simple changes in optical intensity. This eliminates problems caused by chromatic dispersion that result in RF signal fading for conventional high frequency fiber optic links. An illustration of using the invention for remote sensing is shown in FIG. 11.

Figure 11:
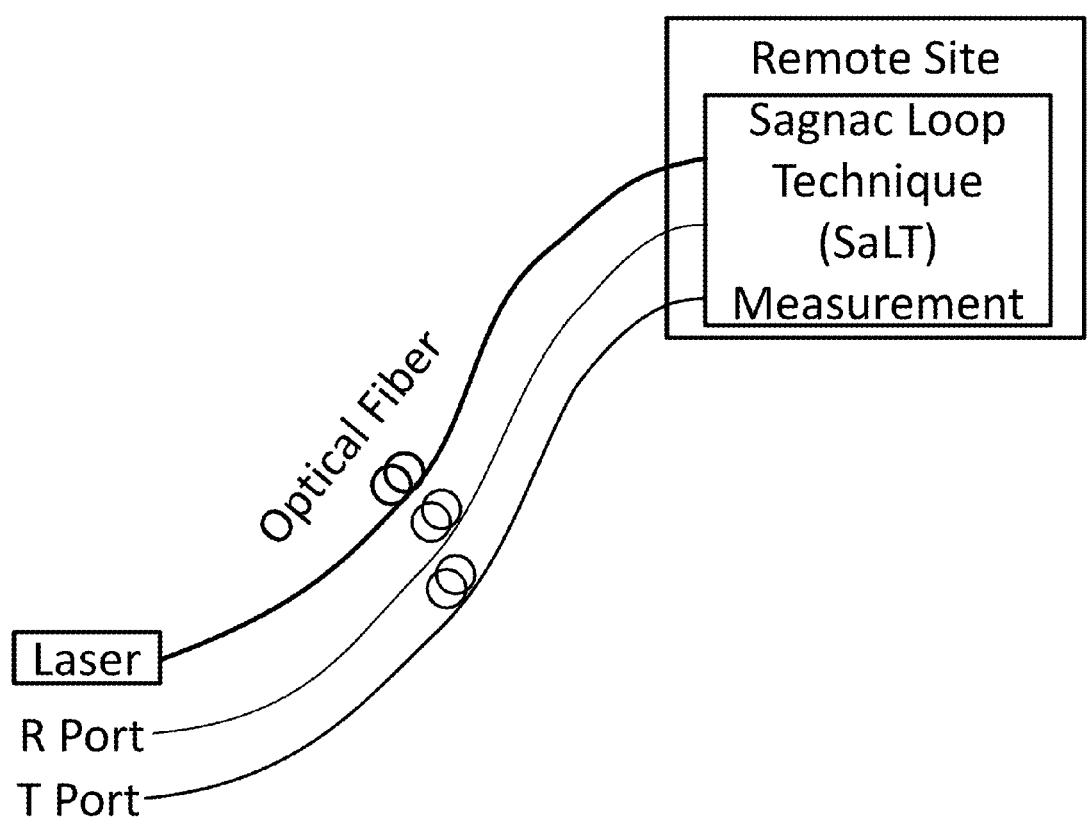
FIG. 11 shows an illustration of using the invention for remote RF test and measurement.

FIG. 11 shows an illustration of using the invention for remote RF test and measurement. The SaLT or ReSaLT measurement is employed remotely via low-loss optical fiber.

The invention provides a technique for in-line embedded RF test that uses electro-optic modulators and the previous new techniques.

In-Line, Embedded RF Test and Measurement

The process of electro-optic modulation is unique in that the RF signal is mapped to the optical domain, but the RF signal is not blocked. This allows the RF signal to be measured without interrupting its transmission. When the RF signal passes through the electro-optic modulator, it only experiences frequency dependent attenuation, just as it does when it passes through a coaxial cable. This feature allows many new possible applications for this invention that involve in-line, embedded RF test and measurement of critical systems. The SaLT or ReSaLT preferred embodiments may be applied to continuously monitor the RF performance of critical systems without interfering with their operation. An illustration of non-blocking embedded RF test and measurement is shown in FIG. 12.

FIG. 12 shows in-line, non-blocking RF test and measurement illustrated with the SaLT measurement.

Measurement of Differential Phase

In the description of the measurement of RF $S_{21}$, the phase changes induced on the RF signal by the DUT were extracted with the second electro-optic modulator. It is clear that the invention also encompasses the ability to measure the differential phase on any signal incident on both the first and the second electro-optic modulators. The signal does not need to travel through a DUT. Instead, the signal may be independently incident on both electro-optic modulators. One application of this feature of the invention is in direction finding antenna arrays. When antennas are linearly arrayed in one or two dimensions, the phase difference between signals received by different elements of the array can be used to determine the direction from which the signal originated. Signals that originate off center of the antenna array travel different distances to reach the different antenna elements. This differential propagation length translates into a differential phase. If electro-optic modulators are connected to each of the array elements and to each other via optical fiber, the differential phase can be detected in the optical sidebands using an optical architecture similar to the ReSaLT measurement technique but extended to include an electro-optic modulator for each element of the antenna array.

RF Signal Cancellation

The signals incident on the electro-optic modulators in the ReSaLT architecture need not be identical in their frequency content. In certain applications such as jamming resistance or co-site interference reduction it is desirable to suppress unwanted signals to protect sensitive receivers or to increase measurement dynamic range. If a combination of wanted and unwanted signals are incident on the first electro-optic modulator in the ReSaLT architecture, the unwanted signals can be suppressed in the second electro-optic modulator by applying signals that have the same amplitude as the unwanted signals but opposite phase.

Detection of Small RF Frequency Offsets at High RF Frequency

The invention can also be extended to the case of not only signals with different amplitude and phase at the two electro-optic modulators in the ReSaLT architecture, but also different frequency signals. The signals of different frequency (as well as amplitude and phase) that are incident on the two electro-optic modulators generate optical sidebands that preserve the frequency, amplitude and phase of the sources. Using the optical carrier suppression techniques of the SaLT and ReSaLT techniques these offset frequency and phase optical sidebands exit the Sagnac loop and can be detected at the difference frequency of the two signals by low frequency photodetectors. The phase difference of the signals is also preserved and reproduced in the difference frequency signal. Even very high frequency signals with small to moderate frequency offsets can be optically mixed and detected with low cost, low speed photodetectors because the detection frequency is determined not by the absolute RF frequency but by the small frequency offset between signals. Higher offset frequencies can be supported by moderate cost, higher speed photodetectors. There are several useful applications of this embodiment of the invention including Doppler shift radar in which the detected signal has a slightly different frequency than the transmitted signal. Likewise, this technique can be used for direct optical downconversion of RF signals to an IF without the need of an RF mixer. This embodiment of the invention can also be used for precision clock distribution over long distances. Precision clocks are typically synchronized to a reference oscillator that has a characteristic resonance frequency. Synchronizing secondary clocks to this reference is done by measuring small frequency differences between the reference and secondary clock. If the reference clock's frequency is used to drive a first electro-optic modulator and a secondary clock's frequency is used to drive a second electro-optic modulator (that may be separated from the reference clock by a long distance), the difference frequency detected between the optical sidebands in a ReSaLT architecture can be used to re-synchronize the secondary clock to the reference clock. These examples illustrate a few of the applications of this embodiment of the invention.

The current invention improves on all of the deficiencies of prior electro-optic test and measurement techniques and enables new RF test and measurement techniques. It is a very fast, swept RF frequency measurement that is >1000× faster than grating based OSAs. It is low cost, requiring only passive telecom grade fiber optic components <$1k as compared to $100k for an OSA. It can operate at any wavelength, provided that passive fiber optic components are available. We have demonstrated measurements from 780 nm to 2000 nm. It is high resolution allowing both low RF frequencies and high RF frequencies to be measured accurately.

The current invention uses optical carrier suppression to increase the signal to noise ratio and reduce the background to allow much higher sensitivity measurements. The prior art is also deficient in that it is limited to measuring Mach Zehnder modulators, while the current invention allows the measurement of both Phase Modulators as well as Mach Zehnder modulators.

RF test and measurement equipment is highly developed and quite versatile. However, RF components often have limited operational bandwidths. This means that different devices or test sets must be used for low frequency measurements and high frequency measurements. This bandwidth limitation is the primary deficiency of conventional RF test and measurement equipment. State of the art instruments overcome this limitation to some extent by utilizing complex switch networks to use different components for different frequency ranges. This adds to the cost and complexity of the instrument and reduces the reliability. The present invention maps the RF signal to the optical domain and utilizes the extreme bandwidth of optical components to enable the processing of both low and high frequency RF signals in a single, simple system. Optical components can easily support signals with >1 THz bandwidth as compared to conventional RF components that are typically limited to 10s of GHz or less. The extreme bandwidth of the present invention coupled with the low cost components used to construct it provide a significant cost savings compared to conventional RF test and measurement equipment.

The invention can be used to calibrate and test electro-optic modulators as well as RF devices. This makes it essentially equivalent to what is commonly called a Lightwave Component Analyzer. A Lightwave Component Analyzer commonly consists of an RF vector network analyzer and additional components to allow electro-optic modulator characterization. The present invention can accomplish all these tasks, so it has great commercial value in the RF test and measurement market. It can also allow additional functionality that is not possible with RF test and measurement equipment including embedded in-line test and measurement, remote sensing, etc. These capabilities have value both for Military and commercial applications.

Test and measurement equipment manufacturers may be interested, because this invention is broadly applicable to RF test and measurement and electro-optic modulator test and measurement.

Military customers may also be interested in this technology, because it is small, low cost and low power, making it suitable for deployment on ships, aircraft, or mobile vehicles for Radar and Electronic Warfare applications.

Terms used in the following supporting calculations are:
- $E_0$: Amplitude of the optical field before modulation
- $\Omega_c$: Optical frequency
- j: Imaginary number
- t: Time $$\Phi(t) = \frac{\pi V}{V_\pi} \cos(\omega_{RF} t):$$

Phase modulation due to applying a signal with voltage V and RF frequency $\omega_{RF}$ to an electro-optic phase modulator.
- V: Voltage of the RF signal applied to the phase modulator.
- $\omega_{RF}$: Frequency of the RF signal applied to the phase modulator (radians/second)
- $V_\pi$: Voltage that must be applied to the electro-optic phase modulator to induce a $\pi$ phase shift in the optical field.
- $E(t)=E_0 e^{j\Omega_c t} e^{j\Phi(t)}$: Time dependent optical field after modulation
- $n_{opt}$: Optical index of refraction in the electro-optic modulator optical waveguide.
- $n_{elec}$: Electrical index of refraction in the electro-optic modulator electrode.
- c: Speed of light in meters/second (m/s).
- f: Frequency of the modulation signal in Hertz (Hz).

L: Length of the electro-optic modulator electrode in meters (m).

$$\gamma = \frac{\pi(n_{opt} + n_{elec})L}{c} f \text{ and } L = \frac{\tau(ps) \times 10^{-12} c}{2 n_{elec}}:$$

Terms that define the velocity mismatch of the forward propagating RF and backward propagating optical signals.\

$$\Phi_F = \frac{\pi V}{V_\pi}\left(\cos(\omega_{RF} t) + \eta\rho \frac{\sin\gamma}{\gamma}\cos(\omega_{RF}(t - (\tau \to 0)) + \phi_\rho)\right)$$

$$\Phi_R = \frac{\pi V}{V_\pi}\left(\frac{\sin\gamma}{\gamma}\cos\left(\omega_{RF}\left(t - \left(\frac{\tau}{2} \to -\frac{\tau}{2}\right)\right)\right) + \eta\rho\cos\left(\omega_{RF}\left(t - \frac{\tau}{2}\right) + \phi_\rho\right)\right):$$

Forward and Reverse phase modulation

η: Electrical loss experienced by the RF signal in the electro-optic modulator electrode.

ρ: Reflection of the RF signal off of the electro-optic modulator electrode termination.\

φ$_\rho$: Phase shift of the reflected RF signal when it reflects off of the electro-optic modulator electrode termination.

τ/2: The time it takes for the RF signal to travel the length of the electro-optic modulator electrode.

τ: The time it takes for the RF signal to travel twice the length of the electro-optic modulator electrode.

$$\beta = \frac{\pi V}{V_\pi}:$$

Modulation efficiency of the RF as it drives the forward optical field.

$$\beta \text{sinc}(\gamma) = \frac{\pi V}{V_\pi}\frac{\sin\gamma}{\gamma}:$$

Modulation efficiency of the RF as it drives the reverse optical field.

τ→0 and τ/2→−τ/2: This notation indicates that there is a distribution of RF delays on the modulated light due to the fact that the optical wave and the RF wave are propagating in opposite directions through the phase modulator. This results in a distribution of modulation time delays.

α: Optical power split in the nominally 50:50 coupler. The light is split α:1−α. For a perfect coupler half of the light travels the forward path and half of the light travels the reverse path so α=1−α=0.5

$J_n(x)$: Bessel function of the first kind $T^2$: Transmitted optical power $R^2$: Reflected optical power T: Fiber delay If an input laser electric field is incident on a phase modulator that is driven with a sinusoidal RF signal, V cos($\omega_{RF}$t), the resulting output electric field is given by:

$$E(t) = E_0 e^{j\Omega_c t} e^{j\Phi(t)}$$

Where $\Omega_c$ is the laser carrier frequency and (NO is the phase modulation which is given by:

$$\Phi(t) = \frac{\pi V}{V_\pi}\cos(\omega_{RF} t),$$

Where $V_\pi$ is the halfwave voltage of the phase modulator. The output electric field is therefore:

$$E(t) = E_0 e^{j\Omega_c t} e^{j\frac{\pi V}{V_\pi}\cos(\omega_{RF} t)}$$

We can rewrite this using the Jacobi Anger expansion $$E(t) = E_0 e^{j\Omega_c t} \sum_{n=-\infty}^{\infty} j^n J_n\left(\frac{\pi V}{V_\pi}\right) e^{jn\omega_{RF} t}$$

This shows that the optical sideband amplitude is proportional to Bessel functions of the first kind. The optical carrier frequency does not depend on n so we can bring it inside the sum to illustrate the optical sideband generation.

$$E(t) = E_0 \sum_{n=-\infty}^{\infty} j^n J_n\left(\frac{\pi V}{V_\pi}\right) e^{j(\Omega_c + n\omega_{RF}) t}$$

The frequency of the optical sidebands can be more clearly illustrated by taking the Fourier transform of this time domain expression. In the frequency domain the phase modulated electric field is:

$$E(\Omega) = E_0 \sum_{n=-\infty}^{\infty} j^n J_n\left(\frac{\pi V}{V_\pi}\right) \delta(\Omega - (\Omega_c + n\omega_{RF}))$$

From this expression it is clear that the electric field has components that are spaced around the carrier by integer multiples of the modulation frequency, $\omega_{RF}$, which can be seen on an optical spectrum analyzer as optical sidebands around the carrier.

Performance Analysis with the Phase Modulator in a Sagnac Loop

Consider the case of placing a single phase modulator off center in a Sagnac loop. This is the simplest configuration and will be extended in later calculations to cover more elaborate situations. The Sagnac loop is formed by creating a pathway between two ports of a single optical 50:50 coupler. Light travels both directions through the loop. When a phase modulator is placed off center in the loop, light passes in both directions through the phase modulator, but an RF signal applied to the phase modulator primarily drives the forward propagating light, because the speed of the RF signal and the optical signal are well matched in the forward direction. The counter-propagating light in contrast is only weakly modulated and the poor modulation efficiency is related to the velocity mismatch. Placing the phase modulator off center creates a relative path-length difference for the RF modulated light that travels forward through the phase modulator relative to the backward propagating RF modulated light. This path-length difference is useful for separating the measurement observables as explained in detail below.

First, a few parameters are defined to cover the non-velocity matched counter-propagating RF and optical. Here, $n_{opt}$ and $n_{elec}$ are the optical and electrical indices of refraction respectively. We assume that both are 2.15. c is the speed of light in m/s and f is the frequency in Hz. L is the length of the electrode.

$$\gamma = \frac{\pi(n_{opt}+n_{elec})L}{c}f \text{ and } L = \frac{\tau(ps) \times 10^{-12} c}{2n_{elec}}$$

Then, the phase modulation that occurs for the forward propagating and reverse propagating light in a single phase modulator is given by:

$$\Phi_F = \frac{\pi V}{V_\pi}\left(\cos(\omega_{RF} t) + \eta\rho\frac{\sin\gamma}{\gamma}\cos(\omega_{RF}(t-(\tau \to 0)) + \phi_\rho)\right)$$

$$\Phi_R = \frac{\pi V}{V_\pi}\left(\frac{\sin\gamma}{\gamma}\cos(\omega_{RF}(t-(\frac{\tau}{2} \to -\frac{\tau}{2}))) + \eta\rho\cos(\omega_{RF}(t-\frac{\tau}{2}) + \phi_\rho)\right)$$

These expressions may be condensed a bit by defining a few variables.

$$\beta = \frac{\pi V}{V_\pi}$$

$$\beta\,\text{sinc}(\gamma) = \frac{\pi V}{V_\pi}\frac{\sin\gamma}{\gamma}$$

In the expressions for the phase modulation above, τ/2 is the transit time one direction through the electrode and ρ is the reflection off of the device's electrode termination. For completeness we note that the reflection may come with a phase shift, $\phi_\rho$. The η represents the loss the RF signal experiences as it traverses the RF electrode once. The notation of τ→0 and τ/2→-τ/2 indicates that there is a distribution of RF delays on the modulated light due to the fact that the optical wave and the RF wave are propagating in opposite directions through the phase modulator. This results in a distribution of modulation time delays. For simplicity only the extrema of the time delays are carried through the calculations. This distribution of time delays is referred to in a discussion of representative experimental data below. Now, one can propagate the input laser electric field through the 50:50 coupler, the phase modulator, the fiber delay, T, and back through the 50:50 coupler using the Jones matrix formalism. In reality, the 50:50 coupler is not perfect so we have instead an optical power split that is α:1−α.

$$\begin{bmatrix}T\\R\end{bmatrix} = \begin{bmatrix}\sqrt{\alpha} & -j\sqrt{1-\alpha}\\-j\sqrt{1-\alpha} & \sqrt{\alpha}\end{bmatrix}\begin{bmatrix}1 & 0\\0 & \Gamma(T)\end{bmatrix}\begin{bmatrix}\exp(j\Phi_F(t))\\\exp(j\Phi_R(t))\end{bmatrix}$$

$$\begin{bmatrix}\sqrt{\alpha} & -j\sqrt{1-\alpha}\\-j\sqrt{1-\alpha} & \sqrt{\alpha}\end{bmatrix}\begin{bmatrix}E_0 e^{j\Omega_c t}\\0\end{bmatrix}$$

$$\begin{bmatrix}T\\R\end{bmatrix} = \begin{bmatrix}\sqrt{\alpha} & -j\sqrt{1-\alpha}\\-j\sqrt{1-\alpha} & \sqrt{\alpha}\end{bmatrix}\begin{bmatrix}1 & 0\\0 & \Gamma(T)\end{bmatrix}\begin{bmatrix}\exp(j\Phi_F(t))\\\exp(j\Phi_R(t))\end{bmatrix}$$

$$\begin{bmatrix}\sqrt{\alpha}E_0 e^{j\Omega_c t}\\-j\sqrt{1-\alpha}E_0 e^{j\Omega_c t}\end{bmatrix}$$

$$\begin{bmatrix}T\\R\end{bmatrix} = \begin{bmatrix}\sqrt{\alpha} & -j\sqrt{1-\alpha}\\-j\sqrt{1-\alpha} & \sqrt{\alpha}\end{bmatrix}\begin{bmatrix}1 & 0\\0 & \Gamma(T)\end{bmatrix}\begin{bmatrix}\sqrt{\alpha}E_0\exp(j(\Omega_c t + \Phi_F(t)))\\-j\sqrt{1-\alpha}E_0\exp(j(\Omega_c t + \Phi_R(t)))\end{bmatrix}$$

$$\begin{bmatrix}T\\R\end{bmatrix} = \begin{bmatrix}\sqrt{\alpha} & -j\sqrt{1-\alpha}\\-j\sqrt{1-\alpha} & \sqrt{\alpha}\end{bmatrix}\begin{bmatrix}\sqrt{\alpha}E_0\exp(j(\Omega_c t + \Phi_F(t)))\\-j\sqrt{1-\alpha}E_0\exp(j(\Omega_c t + \Phi_R(t-T)))\end{bmatrix}$$

$$\begin{bmatrix}T\\R\end{bmatrix} =$$

$$\begin{bmatrix}\alpha E_0\exp(j(\Omega_c t + \Phi_F(t))) - (1-\alpha)E_0\exp(j(\Omega_c t + \Phi_R(t-T)))\\-j\sqrt{\alpha-\alpha^2}E_0\exp(j(\Omega_c t + \Phi_F(t))) - j\sqrt{\alpha-\alpha^2}E_0\exp(j(\Omega_c t + \Phi_R(t-T)))\end{bmatrix}$$

Note that the delay only matters for the optical sideband generated by the phase modulation, because the carrier travels the same distance regardless of the location of the fiber delay. Now we can write the transmitted and reflected electric fields in terms of Bessel functions using the Jacobi-Anger expansion.

$$T = E_0 e^{j\Omega_c t}$$

$$\begin{bmatrix}\alpha\sum_{n=-\infty}^{\infty}j^n J_n(\beta)e^{jn\omega_{RF}t}\sum_{n=-\infty}^{\infty}j^n J_n(\beta\eta\rho\,\text{sinc}(\gamma))e^{jn\omega_{RF}t}e^{-jn\omega_{RF}\tau}e^{jn\phi_\rho} -\\(1-\alpha)\sum_{n=-\infty}^{\infty}j^n J_n(\beta\,\text{sinc}(\gamma))e^{jn\omega_{RF}t}e^{-jn\omega_{RF}T}e^{jn\omega_{RF}\tau/2}\\\sum_{n=-\infty}^{\infty}j^n J_n(\beta\eta\rho)e^{jn\omega_{RF}t}e^{-jn\omega_{RF}T}e^{-jn\omega_{RF}\tau/2}e^{jn\phi_\rho}\end{bmatrix}$$

$$R = -jE_0 e^{j\Omega_c t}\sqrt{\alpha-\alpha^2}$$

$$\begin{bmatrix}\sum_{n=-\infty}^{\infty}j^n J_n(\beta)e^{jn\omega_{RF}t}\sum_{n=-\infty}^{\infty}j^n J_n(\beta\eta\rho\,\text{sinc}(\gamma))e^{jn\omega_{RF}t}e^{-jn\omega_{RF}\tau}e^{jn\phi_\rho} +\\\sum_{n=-\infty}^{\infty}j^n J_n(\beta\,\text{sinc}(\gamma))e^{jn\omega_{RF}t}e^{-jn\omega_{RF}T}e^{jn\omega_{RF}\tau/2}\\\sum_{n=-\infty}^{\infty}j^n J_n(\beta\eta\rho)e^{jn\omega_{RF}t}e^{-jn\omega_{RF}T}e^{-jn\omega_{RF}\tau/2}e^{jn\phi_\rho}\end{bmatrix}$$

This expression shows that the electric fields on both the transmitted port and the reflected port carry signals that have a frequency dependence determined by the fiber delay, T, as well as the electrode transit time, r. This becomes important in the discussion of the detected signals below.

It is useful and important to consider the case of using a low speed optical detector or power meter to measure $T^2$ and $R^2$. A low speed detector is not able to sense the rapidly oscillating RF signal as a function of time, t. This means that all of the $\omega_{RF} t$ signals for m≠n are suppressed. This simplifies the expression and puts constraints on the types of cross terms that can exist. If we compute the transmitted, T, and reflected, R, optical power with the low speed detector constraint, we have:

$$T^2 = E_0^2 \begin{bmatrix} \alpha^2 \sum_{n=-\infty}^{\infty} J_n^2(\beta) \sum_{m=-\infty}^{\infty} J_m^2(\beta\eta\text{sinc}(\gamma)) + \\ (1-\alpha)^2 \sum_{n=-\infty}^{\infty} J_n^2(\beta\text{sinc}(\gamma)) \sum_{m=-\infty}^{\infty} J_m^2(\beta\eta\rho) - \\ \alpha(1-\alpha) \sum_{l=-\infty}^{\infty} j^l J_l(\beta) e^{jl\omega_{RF}t} \\ \sum_{m=-\infty}^{\infty} j^m J_m(\beta\eta\rho\text{sinc}(\gamma)) e^{jm\omega_{RF}t} e^{-jm\omega_{RF}\tau} e^{jm\phi\rho} \times \\ \sum_{n=-\infty}^{\infty} -j^n J_n(\beta\text{sinc}(\gamma)) e^{-jn\omega_{RF}t} e^{+jn\omega_{RF}T} e^{-jn\omega_{RF}\tau/2} \\ \sum_{p=-\infty}^{\infty} -j^p J_p(\beta\eta\rho) e^{-jp\omega_{RF}t} e^{jp\omega_{RF}T} e^{jp\omega_{RF}\tau/2} e^{-jp\phi\rho} - \\ \alpha(1-\alpha) \sum_{l=-\infty}^{\infty} -j^l J_l(\beta) e^{-jl\omega_{RF}t} \\ \sum_{m=-\infty}^{\infty} -j^m J_m(\beta\eta\rho\text{sinc}(\gamma)) e^{-jm\omega_{RF}t} e^{jm\omega_{RF}\tau} e^{-jm\phi\rho} \times \\ \sum_{n=-\infty}^{\infty} j^n J_n(\beta\text{sinc}(\gamma)) e^{jn\omega_{RF}t} e^{-jn\omega_{RF}T} e^{jn\omega_{RF}\tau/2} \\ \sum_{p=-\infty}^{\infty} j^p J_p(\beta\eta\rho) e^{jp\omega_{RF}t} e^{-jp\omega_{RF}T} e^{-jp\omega_{RF}\tau/2} e^{jp\phi\rho} \end{bmatrix}$$

$$R^2 = E_0^2(\alpha - \alpha^2) \begin{bmatrix} \sum_{n=-\infty}^{\infty} J_n^2(\beta) \sum_{m=-\infty}^{\infty} J_m^2(\beta\eta\text{sinc}(\gamma)) + \\ \sum_{n=-\infty}^{\infty} J_n^2(\beta\text{sinc}(\gamma)) \sum_{m=-\infty}^{\infty} J_m^2(\beta\eta\rho) + \\ \sum_{l=-\infty}^{\infty} -j^l J_l(\beta) e^{jl\omega_{RF}t} \\ \sum_{m=-\infty}^{\infty} j^m J_m(\beta\eta\rho\text{sinc}(\gamma)) e^{jm\omega_{RF}t} e^{-jm\omega_{RF}\tau} e^{jm\phi\rho} \times \\ \sum_{n=-\infty}^{\infty} -j^n J_n(\beta\text{sinc}(\gamma)) e^{-jn\omega_{RF}t} e^{+jn\omega_{RF}T} e^{-jn\omega_{RF}\tau/2} \\ \sum_{p=-\infty}^{\infty} -j^p J_p(\beta\eta\rho) e^{-jp\omega_{RF}t} e^{jp\omega_{RF}T} e^{+jp\omega_{RF}\tau/2} e^{-jp\phi\rho} + \\ \sum_{l=-\infty}^{\infty} -j^l J_l(\beta) e^{-jl\omega_{RF}t} \sum_{m=-\infty}^{\infty} - \\ j^m J_m(\beta\eta\rho\text{sinc}(\gamma)) e^{-jm\omega_{RF}t} e^{+jm\omega_{RF}\tau} e^{-jm\phi\rho} \times \\ \sum_{n=-\infty}^{\infty} j^n J_n(\beta\text{sinc}(\gamma)) e^{jn\omega_{RF}t} e^{-jn\omega_{RF}T} e^{+jn\omega_{RF}\tau/2} \\ \sum_{p=-\infty}^{\infty} j^p J_p(\beta\eta\rho) e^{jp\omega_{RF}t} e^{-jp\omega_{RF}T} e^{-jp\omega_{RF}\tau/2} e^{jp\phi\rho} \end{bmatrix}$$

The low speed photodetectors produce signals that have components that depend on the homodyne interference between the forward modulation and itself and the reverse modulation and itself. The only frequency dependence in these signals is given by the frequency dependence of β and sinc(γ) that depend on the modulator $V_\pi$ and the velocity mismatch. In addition, there are "heterodyne" cross terms between the forward and reverse modulation that include a term that varies with RF frequency according to the fiber delay, T, and the electrode transit time τ/2. When data is collected as a function of frequency, the transmitted and reflected power oscillates with RF frequency with a nominal period of 1/T where T is the relative fiber delay between the forward and reverse directions.

Figure 13:
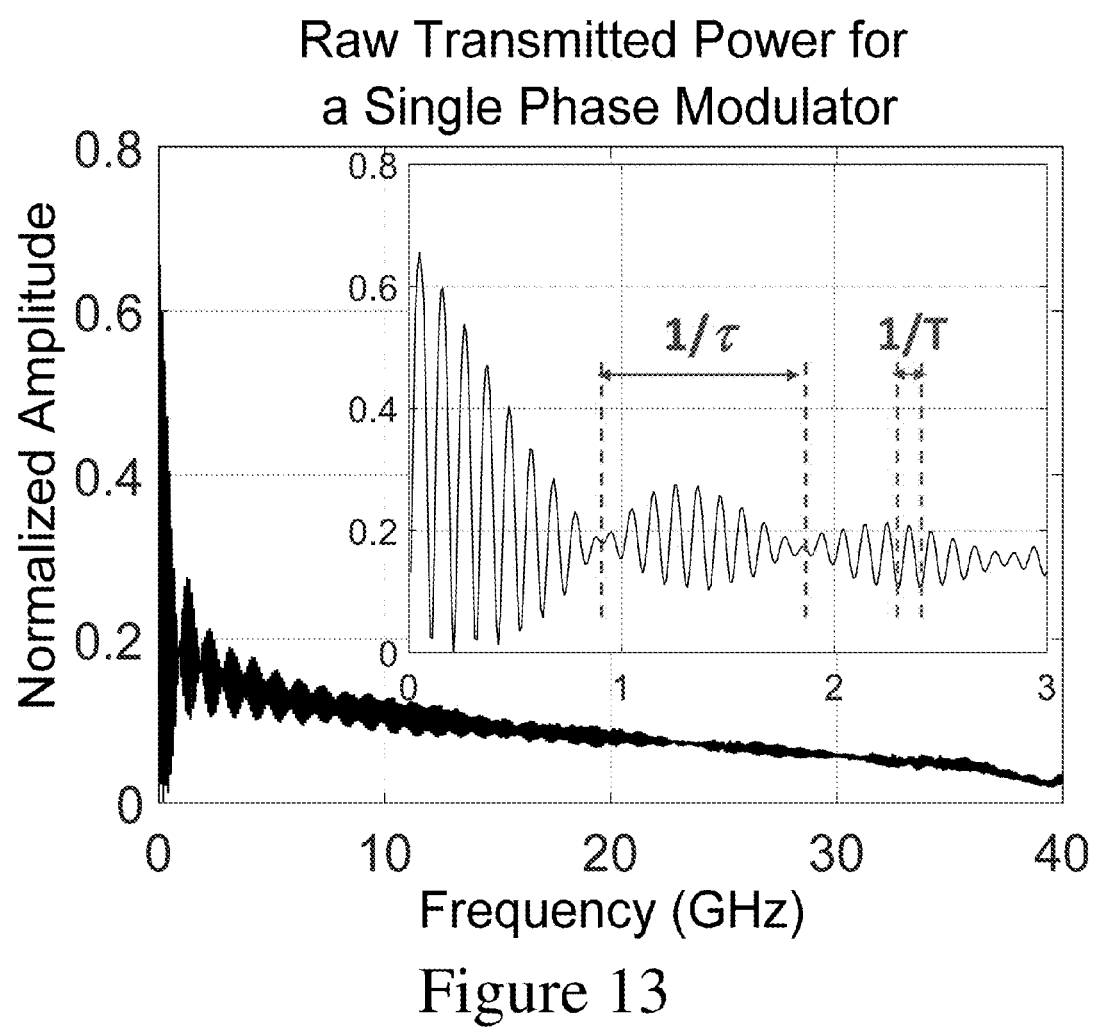
FIG. 13 shows raw transmitted power vs. RF frequency for a single phase modulator in a Sagnac loop. The inset highlights the periodic oscillations at 1/T and 1/τ.

A graph of the raw transmitted power that highlights these two components is shown in FIG. 13. FIG. 13 shows raw transmitted power vs. RF frequency for a single phase modulator in a Sagnac loop. The inset highlights the periodic oscillations at 1/T and 1/τ.

The homodyne and heterodyne components can be separated from one another by Fourier transforming the frequency domain scan. It is important to note here that we are transforming the frequency domain data into the time domain so that we can isolate terms at different time delays (different time components). The dominant heterodyne cross terms appear near the fiber delay, T, and the homodyne terms appear close to time t=0. By low pass filtering in the time domain or applying a moving average to the data in the frequency domain, the heterodyne terms can be removed. First, however, we should consider the expression as a whole to understand how the different terms contribute.

Figure 14:
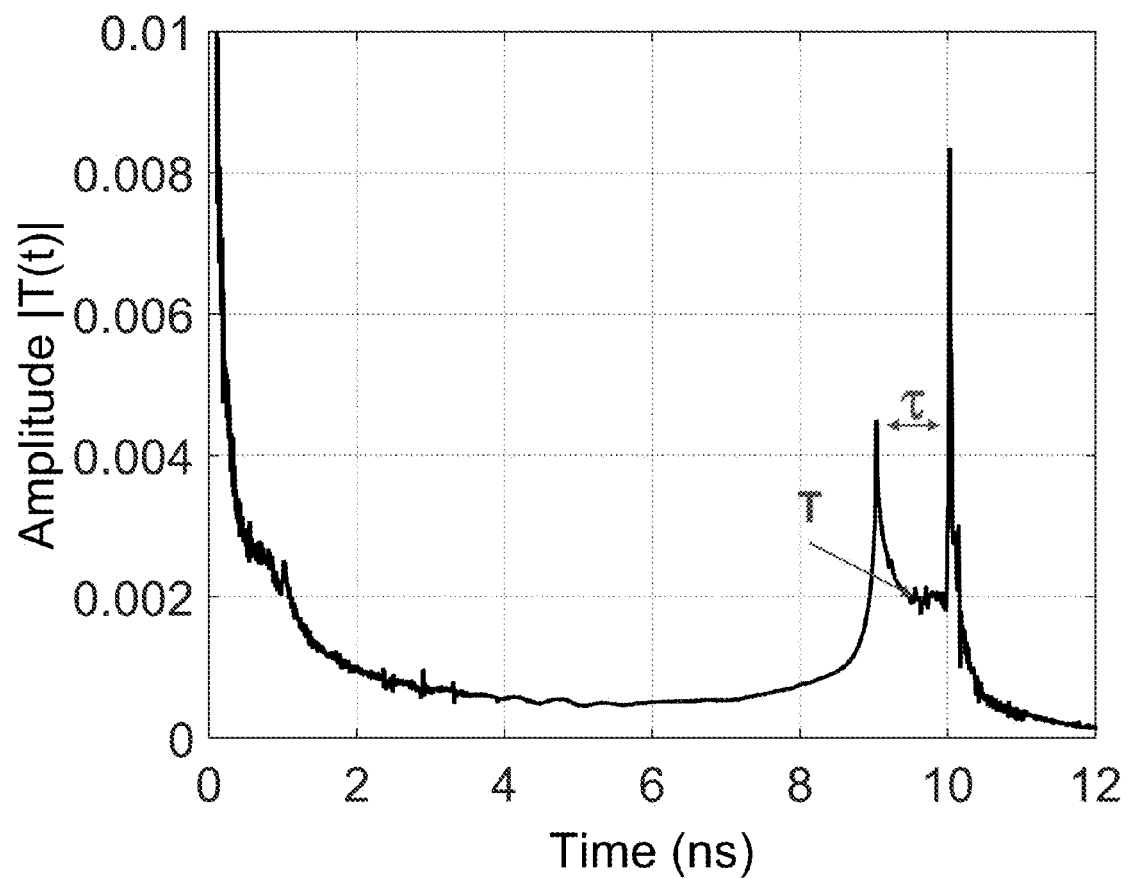
FIG. 14 shows the single sided amplitude "spectrum" of the transmitted power. The fiber delay, T, is observable as the large feature centered at 9.5 ns with additional peaks split by τ, twice the electrode transit time.

The oscillatory nature of the transmitted power suggests that we can gain additional insights by Fourier transforming the frequency dependent data into the time domain. This single sided amplitude of the transmitted power in the time domain is shown in FIG. 14. FIG. 14 shows the single sided amplitude "spectrum" of the transmitted power. The fiber delay, T, is observable as the large feature centered at 9.5 ns with additional peaks split by t, twice the electrode transit time.

FIG. 14 shows a large component near time equal to zero and a secondary feature centered around 9.5 ns. The fiber delay, T, is 9.5 ns and the splitting of the two peaks around the fiber delay is τ (twice the time it takes for the RF signal to travel through the RF electrode). The presence of these features in the time domain "spectrum" is important, but if we are only concerned with determining the electro-optic modulator performance we can low pass filter this time "spectrum" to remove all the terms that depend on T, and τ. Furthermore, we can often make the approximation that the terms that involve the reflection off the device termination are small. If we do this, we are left with a simplified expression for the transmitted optical power. The expression for the transmitted and reflected intensity above contains many terms. In general there are only a few dominant terms that contribute to the measurement. For example, it is possible to have any combination of m and n for the homodyne terms such as the first term in the expression for $T^2$. A bit more explanation is required here because this statement may seem to contradict the earlier assertion about the low speed detector's ability to suppress terms with m≠n. The low speed detector does not support terms that oscillate at the RF frequency and this effectively ensures that there are no cross terms between different orders, m and n, of the same modulation such as:

$$\sum_{n=-\infty}^{\infty} J_n(\beta) e^{jn\omega_{RF}t} \sum_{m=-\infty}^{\infty} J_m(\beta) e^{jm\omega_{RF}t}$$

$$\sum_{p=-\infty}^{\infty} J_p(\beta\eta\rho\mathrm{sinc}(\gamma))e^{jp\omega_{RF}t} \sum_{q=-\infty}^{\infty} J_q(\beta\eta\rho\mathrm{sinc}(\gamma))e^{jp\omega_{RF}t}$$

The expression above consists of cross terms between different orders of $J_n(\beta)$ and this is not supported by the low speed detector. However, products that involve different types of modulation are possible. The low speed detector essentially measures the presence of optical sidebands and we can imagine that the phase modulation from different types of modulation happens sequentially. The first component generates some sidebands. Then, each optical sideband (and the carrier) resulting from the first phase modulation component becomes a carrier for the next phase modulation component to modulate. The low speed detector then picks up all of the energy that is shifted into all of the different sidebands, but not the interference between the sidebands. This means that it is possible to have terms like:

$$\alpha^2 \sum_{n=-\infty}^{\infty} J_n^2(\beta) \sum_{m=-\infty}^{\infty} J_m^2(\beta\eta\rho\mathrm{sinc}(\gamma))$$

However, the argument $\beta\eta\rho\,\mathrm{sinc}(\gamma)$ is generally small so that primarily only the m=0 term will result in significant amplitude. This term can generally be simplified to:

$$\alpha^2 \sum_{n=-\infty}^{\infty} J_n^2(\beta)$$

Similar arguments are valid for the other homodyne terms although it should be understood that neglecting any term is an approximation.

The heterodyne cross terms are somewhat different. It is still true that any combination of terms that results in an oscillatory contribution at $\omega_{RF}t$ will average to zero. Still, there are a variety of combinations of terms that suppress the $\omega_{RF}t$ terms and each of these combinations may result in a signal. For example, let's focus on the transmitted heterodyne cross term.

$$-\alpha(1-\alpha)\sum_{l=-\infty}^{\infty} j^l J_l(\beta)e^{jl\omega_{RF}t} \sum_{m=-\infty}^{\infty} j^m J_m(\beta\eta\mathrm{sinc}(\gamma))e^{jm\omega_{RF}t}e^{-jm\omega_{RF}\tau}$$

$$e^{jm\phi_\rho} \times \sum_{n=-\infty}^{\infty} -j^n J_n(\beta\mathrm{sinc}(\gamma))e^{-jn\omega_{RF}t}e^{+jn\omega_{RF}T}e^{-jn\omega_{RF}\tau/2}$$

$$\sum_{p=-\infty}^{\infty} -j^p J_p(\beta\eta\rho)e^{-jp\omega_{RF}t}e^{jp\omega_{RF}T}e^{jp\omega_{RF}\tau/2}e^{-jp\phi_\rho}$$

$$-\alpha(1-\alpha)\sum_{l=-\infty}^{\infty} -j^l J_l(\beta)e^{-jl\omega_{RF}t}\sum_{m=-\infty}^{\infty} -j^m J_m(\beta\eta\mathrm{sinc}(\gamma))e^{-jm\omega_{RF}t}$$

$$e^{+jm\omega_{RF}\tau}e^{-jm\phi_\rho} \times \sum_{n=-\infty}^{\infty} -j^n J_n(\beta\mathrm{sinc}(\gamma))e^{jn\omega_{RF}t}e^{-jn\omega_{RF}T}$$

$$e^{jn\omega_{RF}\tau/2}\sum_{p=-\infty}^{\infty} j^p J_p(\beta\eta\rho)e^{jp\omega_{RF}t}e^{-jp\omega_{RF}T}e^{-jp\omega_{RF}\tau/2}e^{jp\phi_\rho}$$

There are two types of terms: the simplest term occurs when l, m, n, and p are all zero:

$$-2\alpha(1-\alpha)J_0(\beta)J_0(\beta\eta\rho\,\mathrm{sinc}(\gamma))J_0(\beta\,\mathrm{sinc}(\gamma))J_0(\beta\eta\rho)$$

Then, there are terms that consist of combinations that result in suppression of the $\omega_{RF}t$ terms. Let us consider two important combinations that are the primary contributors to the terms that oscillate with frequency in the transmitted power measurement. One is the case in which l=n=1 and m=p=0 and the other is the case in which l=p=1 and m=n=0. First, l=n=1 and m=p=0:

$$-\alpha(1-\alpha)J_0(\beta\eta\rho\,\mathrm{sinc}(\gamma))J_0(\beta\eta\rho)J_1(\beta)$$
$$J_1(\beta\,\mathrm{sinc}(\gamma))(e^{j\omega_{RF}(T-\tau/2)}+e^{-j\omega_{RF}(T-\tau/2)})$$

Or $$=2(1-\alpha)J_0(\beta\eta\rho\,\mathrm{sinc}(\gamma))J_0(\beta\eta\rho)J_1(\beta)J_1(\beta\,\mathrm{sinc}(\gamma))$$
$$\cos(\omega_{RF}(T-\tau/2))$$

This term has a frequency dependence that oscillates at the fiber delay minus half the electrode transit time.
Next, l=p=1 and m=n=0:

$$-\alpha(1-\alpha)J_0(\beta\eta\rho\,\mathrm{sinc}(\gamma))J_1(\beta\eta\rho)J_1(\beta)$$
$$J_0(\beta\,\mathrm{sinc}(\gamma))(e^{j\omega_{RF}(T-\tau/2-\phi_\rho)}+e^{-j\omega_{RF}(T+\tau/2-\phi_\rho)})$$

Or $$-2\alpha(1-\alpha)J_0(\beta\eta\rho\,\mathrm{sinc}(\gamma))J_1(\beta\eta\rho)J_1(\beta)J_0(\beta\,\mathrm{sinc}(\gamma))$$
$$\cos(\omega_{RF}(T+\tau/2)-\phi_\rho)$$

This term has a frequency dependence that oscillates at the fiber delay plus half the electrode transit time. The plots below show a representative transmitted power measurement as well as the Fourier transform of the measurement.

Figure 15A:
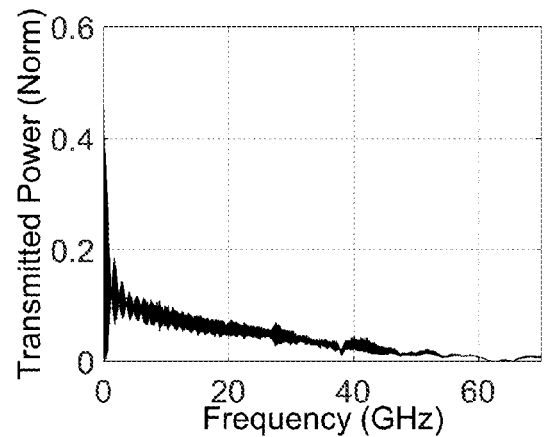
FIG. 15A shows the transmitted power as a function of frequency for a single phase modulator in a Sagnac loop.
Figure 15B:
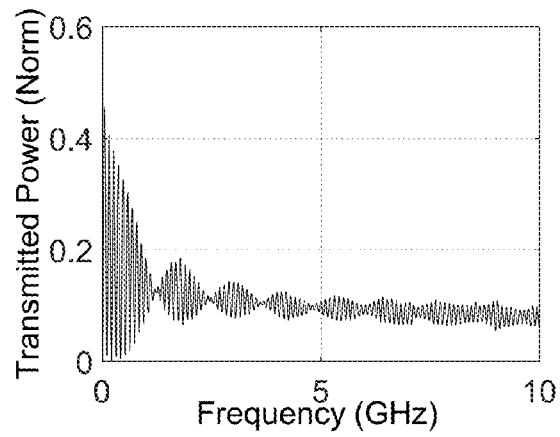
FIG. 15B is an enlarged view of the first 10 GHz of the transmitted power to illustrate the oscillation periods that are present in the transmitted power.

FIG. 15 shows a transmitted power as a function of frequency for a single phase modulator in a Sagnac loop. FIG. 15 is an enlarged view of the first 10 GHz of the transmitted power to illustrate the oscillation periods that are present in the transmitted power. FIG. 15 shows Fourier transform of the transmitted power to the time domain. The homodyne terms contribute significant energy near t=0 and the heterodyne terms contribute significant energy near the fiber delay T~9.5 ns.

The key point of this data is that in the measured transmitted power it appears as though there is primarily a single oscillatory term with a short period in addition to a sinc-like term that damps out over ~5-6 GHz. The Fourier transform, however shows that there are actually two components (peaks) centered around the fiber delay. These two components are those derived above. Other components also exist, but their amplitude is smaller. For example, there is amplitude in the Fourier transform around 19 ns. This corresponds to twice the fiber delay, 2T. This term is generated by n=p=l=m=1:

$$-\alpha(1-\alpha)J_1(\beta\eta\rho\,\mathrm{sinc}(\gamma))J_1(\beta\eta\rho)J_1(\beta)$$
$$J_1(\beta\,\mathrm{sinc}(\gamma))(e^{j\omega_{RF}(2T-(\tau\to-\tau))}+e^{-j\omega_{RF}(2T-(\tau\to-\tau))})$$

Or $$-2\alpha(1-\alpha)J_1(\beta\eta\rho\,\mathrm{sinc}(\gamma))J_1(\beta\eta\rho)J_1(\beta)J_1(\beta\,\mathrm{sinc}(\gamma))$$
$$\cos(\omega_{RF}(2T-(\tau\to-\tau)))$$

Figure 15C:
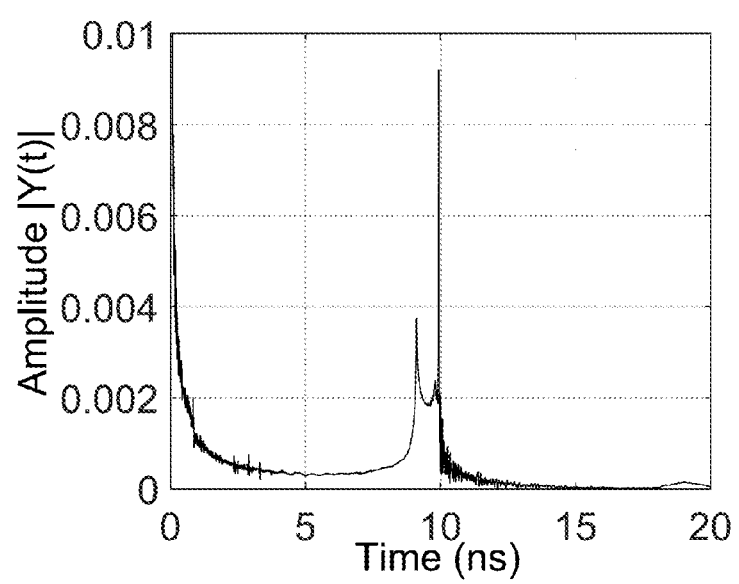
FIG. 15C shows the Fourier transform of the transmitted power to the time domain. The homodyne terms contribute significant energy near t=0 and the heterodyne terms contribute significant energy near the fiber delay T~9.5 ns.

A close examination of the data in FIG. 15C shows that the width of the broad peak around 19 ns is indeed $2\tau$.

It is possible to selectively digitally filter the Fourier transformed data and then transform back to the frequency domain to illustrate the how the peaks in the time domain are generated by different effects. As an example, let us apply rectangular filters to several portions of the Fourier transformed data and then transform back to see the shape of the signals.

Figure 16:
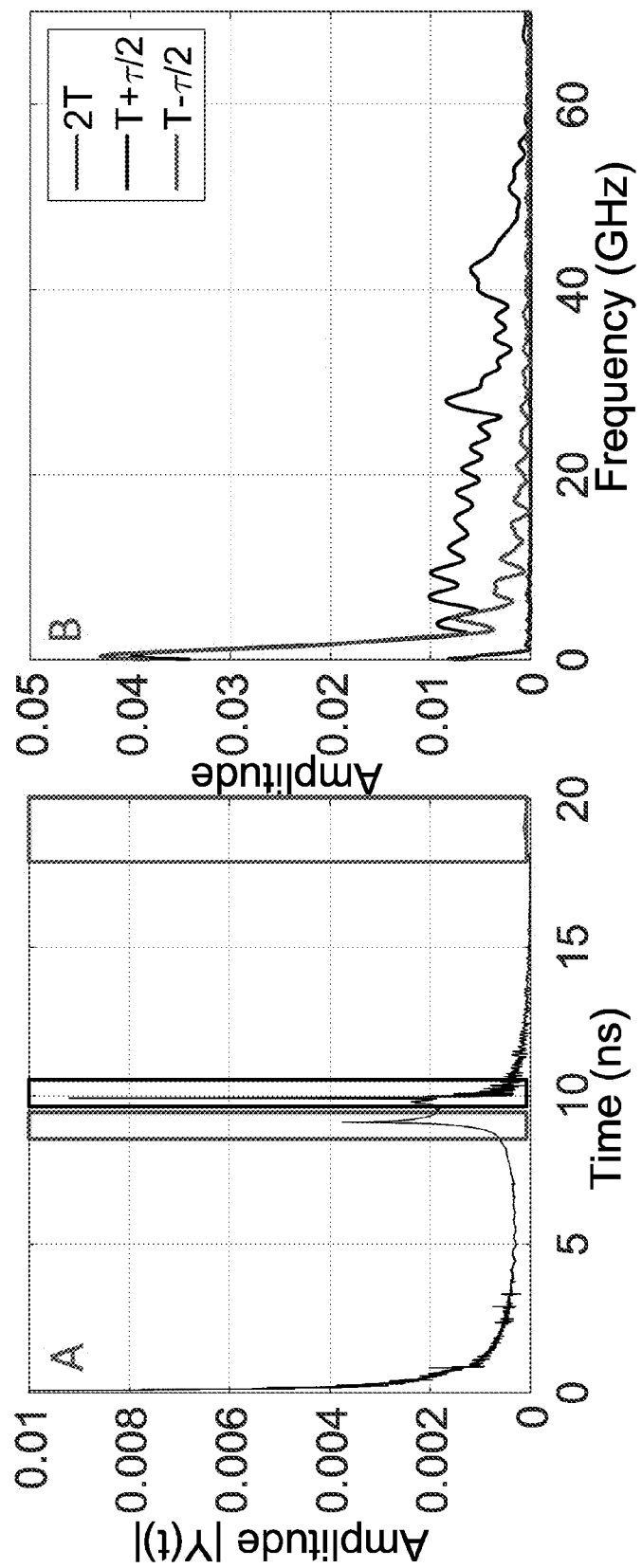
FIG. 16 shows the Fourier transform of the transmitted power of a single phase modulator in a Sagnac loop.

FIG. 16 shows Fourier transform of the transmitted power of a single phase modulator in a Sagnac loop. The red, black, and blue boxes show the areas of the Fourier transform that are digitally filtered to be transformed back to generate the data in B. B. Inverse transformed filtered data. Blue curve: the data around 19 ns, 2T. Black curve: the data around T+τ/2. Red curve: the data around T−τ/2.

First, consider the red filter and the resulting inverse transformed red data. The expected frequency dependence is primarily given by:

$$J_1(\beta) J_1(\beta\, \text{sinc}(\gamma))$$

The signal will decrease as β decreases, but in addition it will decrease rapidly with frequency due to the sinc term. The red data shows the characteristic sinc-like periodicity that pulls the data down to zero fairly rapidly. In contrast, the black filter and resulting inverse transformed black data is dominated by the following terms:

$$J_1(\beta\eta\rho) J_1(\beta)$$

Again, the signal decreases as β decreases, but it is clear that the signal does not decrease nearly as rapidly as the red data. The reason for this is that the black data depends on the reflection off the device termination that is velocity matched with the reverse optical. This allows the signal to persist even at much higher frequency.

Finally, the blue data is expected to be dominated by:

$$J_1(\beta\eta\rho\, \text{sinc}(\gamma)) J_1(\beta\eta\rho) J_1(\beta) J_1(\beta\, \text{sinc}(\gamma))$$

The blue data has a sinc² dependence that pulls the signal down to zero even more rapidly than the red data.

The simple analysis above serves to provide an experimental justification for the equations derived above.

It is also important to reiterate a point that was made earlier in this discussion and then discarded for the sake of simplicity. Any term that is generated as a result of counter-propagating RF and optical produces a distribution of RF delays. This fact was acknowledged with the notation τ→0 and τ/2→τ/2. What this means is that the black data above also includes a sinc component from the situation when the delay is ι/2. This is clearly evident in the large low frequency component in the black data. This distribution of delays that results from the non-velocity matched terms causes the broad distribution of amplitude between the two peaks at ~9 ns and ~10 ns. This distribution of delays also causes the broadening of the signal around 19 ns. It should be clear from the discussion above that it is not desirable to try to disentangle all the non-velocity matched distributions of RF delays. Instead, in the general case of testing a phase modulator, it is preferable to low pass filter the data to remove all of the oscillatory terms. When this is done the expression for the transmitted power is given by:

$$T^2 = E_0^2 \begin{bmatrix} \alpha^2 \sum_{n=-\infty}^{\infty} J_n^2(\beta) \sum_{m=-\infty}^{\infty} J_m^2(\beta\eta\, \text{sinc}(\gamma)) + \\ (1-\alpha)^2 \sum_{n=-\infty}^{\infty} J_n^2(\beta\, \text{sinc}(\gamma)) \sum_{m=-\infty}^{\infty} J_m^2(\beta\eta\rho) - \\ 2(\alpha - \alpha^2) J_0(\beta) J_0(\beta\eta\rho\, \text{sinc}(\gamma)) J_0(\beta\, \text{sinc}(\gamma)) J_0(\beta\eta\rho) \end{bmatrix}$$

By making a further approximation that the reflection terms (any term that includes p) are small gives:

$$T^2 = E_0^2 \begin{bmatrix} \alpha^2 \sum_{n=-\infty}^{\infty} J_n^2(\beta) + \\ (1-\alpha)^2 \sum_{n=-\infty}^{\infty} J_n^2(\beta\, \text{sinc}(\gamma)) - \\ 2(\alpha - \alpha^2) J_0(\beta) J_0(\beta\, \text{sinc}(\gamma)) \end{bmatrix}$$

The electrode length that determines the sinc term can easily be extracted from the Fourier transformed data. Then, with knowledge of the input drive voltage, V, the measurement of transmitted power can be fit to the equation above with the phase modulator V, as the only adjustable parameter. Recall that $$\beta = \frac{\pi V}{V_\pi}.$$

Mach Zehnder Modulator at Null Bias

Mach Zehnder modulators essentially consist of two electro-optic phase modulators that are driven by a single RF electrode. Conventional Mach Zehnder modulators, are typically configured for push/pull operation in which the two arms are driven with RF signals that are 180 degrees out of phase so that one arm is being pulled up while the other arm is pushed down. Other configurations include dual-drive in which separate electrodes are used to drive the each arm and the relative phase of the drive can be controlled separately. Regardless of these details, all Mach Zehnder modulators can be viewed as two phase modulators with different RF drives. The RF drives may have the same magnitude but opposite phase as in a typical X-cut LiNbO₃ MZM. Or the RF drives may have different magnitudes and opposite phase as in a Z-cut LiNbO₃ modulator. The dual-drive case offers the possibility of both a variable magnitude between the two arms as well as a variable phase. The differing magnitude in the RF drive results in what is known as the chirp of a Mach Zehnder modulator and the measurement of that parameter will be described in detail below. First, however, it is important to highlight how a Mach Zehnder modulator can be used to isolate its own optical sidebands to provide a very simple method for determining its $V_\pi$.

In the previous section we described the use of a Sagnac loop to determine the performance of a phase modulator. The primary purpose of the Sagnac loop in this context is to provide a means to suppress the carrier so that the optical sideband power can be measured. It is the power that is transferred to the optical sidebands that contains relevant information about the modulation efficiency of the modulator, $V_\pi$. While the Sagnac loop is critical to suppress the carrier for a phase modulator, a Mach Zehnder modulator can suppress the carrier itself, simply by biasing the modulator at null. Null bias, not only suppresses the carrier, but also results in the greatest amplitude in the first order optical sidebands. It is therefore possible to measure the electro-optic performance of a Mach Zehnder modulator simply by biasing the modulator at null bias and sweeping the RF frequency. We have already derived the output electric field for a Mach Zehnder modulator.

$$E(t) = \frac{E_0}{\sqrt{2}} e^{j\Omega_c t} \left[ \sum_{n=-\infty}^{\infty} j^n \sqrt{\xi} J_n(\beta_1) e^{jn\omega_{RF}t} + \sum_{n=-\infty}^{\infty} j^n \sqrt{1-\xi} J_n(\beta_2) e^{jn\omega_{RF}t} e^{jn\phi_{RF}} e^{j\Phi_B} \right]$$

The intensity is given by:

$$I = \frac{E_0^2}{2} \left[ \sum_{n=-\infty}^{\infty} \xi J_n^2(\beta_1) + (1-\xi) J_n^2(\beta_2) + 2\sqrt{\xi-\xi^2} J_n(\beta_1) J_n(\beta_2) \cos(n\phi_{RF} + \Phi_B) \right]$$

When $\Phi_B = \pi$, the modulator is biased at null. If we have a typical single drive Mach Zehnder modulator (one electrode drives both arms) the RF phase $\varphi_{RF} = \pi$. Then, we can see that regardless of whether $\beta_1 = \beta_2$ the odd order sidebands are maximized because $\cos(n\pi + \pi) = 1$ for odd n.

$$I = \frac{E_0^2}{2} \left[ \sum_{n=-\infty}^{\infty} \xi J_n^2(\beta_1) + (1-\xi) J_n^2(\beta_2) + 2\sqrt{\xi-\xi^2} J_n(\beta_1) J_n(\beta_2) \right]$$

If we are only interested in the overall effective $V_\pi$ of the Mach Zehnder modulator and we are not interested in the chirp (different modulation efficiency in the two arms) we can simplify the expression above by artificially setting $\beta_1 = \beta_2 = \beta$. Then at null for a single drive Mach Zehnder modulator we have:

$$I = \frac{E_0^2}{2} \left[ \sum_{n=-\infty}^{\infty} \xi J_n^2(\beta) + (1-\xi) J_n^2(\beta) + 2\sqrt{\xi-\xi^2} J_n^2(\beta) \cos(n\pi + \pi) \right]$$

The intensity out of the Mach Zehnder modulator at null is primarily dominated by the optical sidebands since the carrier is suppressed and it is therefore possible to extract the modulator $V_\pi$ by fitting the intensity at null to the equation above with the $V_\pi$ as the only adjustable parameter.

It is the factor of n in the cosine term that causes the optical sidebands (and the carrier) to behave differently at different DC bias points.

This will be used later to determine the chirp parameter of a Mach Zehnder modulator, but here the key point is that when the modulator is biased at a null for the carrier, the odd order sidebands are maximized.

Mach Zehnder Modulator in a Sagnac Loop—Mach Zehnder Chirp Measurement

While it is possible to determine the $V_\pi$ of a Mach Zehnder modulator using the null bias technique described above, even more information can be extracted by placing the Mach Zehnder modulator in a Sagnac Loop. The reason for this is that the Sagnac loop suppresses the carrier even when the Mach Zehnder modulator is biased at peak, allowing the optical sidebands to be extracted at any bias point. It is this ability to measure the optical sidebands at any bias point that allows the determination of the Mach Zehnder chirp. The chirp is the difference in the modulation efficiency in the two arms of the Mach Zehnder modulator.

The analysis of a Mach Zehnder modulator in a Sagnac loop begins in much the same way as the phase modulator in a Sagnac loop. We can propagate the optical field through the Sagnac loop using the Jones matrix formalism.

$$\begin{bmatrix} T \\ R \end{bmatrix} = \begin{bmatrix} \sqrt{\alpha} & -j\sqrt{1-\alpha} \\ -j\sqrt{1-\alpha} & \sqrt{\alpha} \end{bmatrix} \begin{bmatrix} 1 & 0 \\ 0 & \Gamma(T) \end{bmatrix} \begin{bmatrix} MZM_F(t) \\ MZM_R(t) \end{bmatrix}$$

$$\begin{bmatrix} \sqrt{\alpha} & -j\sqrt{1-\alpha} \\ -j\sqrt{1-\alpha} & \sqrt{\alpha} \end{bmatrix} \begin{bmatrix} E_0 e^{j\Omega_c t} \\ 0 \end{bmatrix}$$

$$\begin{bmatrix} T \\ R \end{bmatrix} = \begin{bmatrix} \sqrt{\alpha} & -j\sqrt{1-\alpha} \\ -j\sqrt{1-\alpha} & \sqrt{\alpha} \end{bmatrix} \begin{bmatrix} 1 & 0 \\ 0 & \Gamma(T) \end{bmatrix} \begin{bmatrix} MZM_F(t) \\ MZM_R(t) \end{bmatrix}$$

$$\begin{bmatrix} \sqrt{\alpha} E_0 e^{j\Omega_c t} \\ -j\sqrt{1-\alpha} E_0 e^{j\Omega_c t} \end{bmatrix}$$

$$\begin{bmatrix} T \\ R \end{bmatrix} = \begin{bmatrix} \sqrt{\alpha} & -j\sqrt{1-\alpha} \\ -j\sqrt{1-\alpha} & \sqrt{\alpha} \end{bmatrix} \begin{bmatrix} 1 & 0 \\ 0 & \Gamma(T) \end{bmatrix}$$

$$\begin{bmatrix} \sqrt{\alpha} E_0 e^{j\Omega_c t} MZM_F(t) \\ -j\sqrt{1-\alpha} E_0 e^{j\Omega_c t} MZM_R(t) \end{bmatrix}$$

$$\begin{bmatrix} T \\ R \end{bmatrix} = \begin{bmatrix} \sqrt{\alpha} & -j\sqrt{1-\alpha} \\ -j\sqrt{1-\alpha} & \sqrt{\alpha} \end{bmatrix} \begin{bmatrix} \sqrt{\alpha} E_0 e^{j\Omega_c t} MZM_F(t) \\ -j\sqrt{1-\alpha} E_0 e^{j\Omega_c t} MZM_R(t-T) \end{bmatrix}$$

$$\begin{bmatrix} T \\ R \end{bmatrix} = \begin{bmatrix} \alpha E_0 e^{j\Omega_c t} MZM_F(t) - (1-\alpha) E_0 e^{j\Omega_c t} MZM_R(t-T) \\ -j\sqrt{\alpha-\alpha^2} E_0 e^{j\Omega_c t} MZM_F(t) - j\sqrt{\alpha-\alpha^2} E_0 e^{j\Omega_c t} MZM_R(t-T) \end{bmatrix}$$

Here, the splitting ratio of the optical 50:50 coupler is $\alpha 1-\alpha$ as it was for the phase modulator. In order to simplify the expressions above, the propagation of the optical field forward and backward through the Mach Zehnder modulator has been written as $MZM_F(t)$ for example.

$$MZM_F(t) = \frac{E_0}{\sqrt{2}} e^{j\Omega_c t} \left[ \sum_{n=-\infty}^{\infty} j^n \sqrt{\xi} J_n(\beta_1) e^{jn\omega_{RF}t} + \sum_{n=-\infty}^{\infty} j^n \sqrt{1-\xi} J_n(\beta_2) e^{jn\omega_{RF}t} e^{jn\phi_{RF}} e^{j\Phi_B} \right]$$

$$MZM_R(t) = \frac{E_0}{\sqrt{2}} e^{j\Omega_c t} \left[ \sum_{n=-\infty}^{\infty} j^n \sqrt{\xi} J_n(\beta_1 sinc(\gamma)) e^{jn\omega_{RF}t} + \sum_{n=-\infty}^{\infty} \sqrt{1-\xi} J_n(\beta_2 sinc(\gamma)) e^{jn\omega_{RF}t} e^{jn\phi_{RF}} e^{j\Phi_B} \right]$$

And the fiber delay, T, results in:

$$MZM_R(t-T) = \frac{E_0}{\sqrt{2}} e^{j\Omega_c t} \left[ \sum_{n=-\infty}^{\infty} j^n \sqrt{\xi} J_n(\beta_1 sinc(\gamma)) e^{jn\omega_{RF}t} e^{-jn\omega_{RF}T} + \sum_{n=-\infty}^{\infty} j^n \sqrt{1-\xi} J_n(\beta_2 sinc(\gamma)) e^{jn\omega_{RF}t} e^{-jn\omega_{RF}T} e^{jn\phi_{RF}} e^{j\Phi_B} \right]$$

Then using the fact that on a low speed detector, m=n, the transmitted and reflected electric fields can be written as:

$$T = \frac{E_0}{\sqrt{2}} e^{j\Omega_c t} \sum_{n=-\infty}^{\infty} j^n e^{jn\omega_{RF}t} \begin{bmatrix} \alpha(\sqrt{\xi} J_n(\beta_1) + \sqrt{1-\xi} J_n(\beta_2) e^{jn\phi_{RF}} e^{j\Phi_B}) - \\ (1-\alpha)(\sqrt{\xi} J_n(\beta_1 sinc(\gamma)) e^{-jn\omega_{RF}T} + \\ \sqrt{1-\xi} J_n(\beta_2 sinc(\gamma)) e^{-jn\omega_{RF}T} e^{jn\phi_{RF}} e^{j\Phi_B}) \end{bmatrix}$$

$$R = \frac{E_0}{\sqrt{2}} \sqrt{\alpha - \alpha^2} \, e^{j\Omega_c t}$$

$$\sum_{n=-\infty}^{\infty} j^n e^{jn\omega_{RF}t} \begin{bmatrix} \sqrt{\xi} J_n(\beta_1) + \sqrt{1-\xi} J_n(\beta_2) e^{jn\phi_{RF}} e^{j\Phi_B} + \\ \sqrt{\xi} J_n(\beta_1 sinc(\gamma)) e^{-jn\omega_{RF}T} + \\ \sqrt{1-\xi} J_n(\beta_2 sinc(\gamma)) e^{-jn\omega_{RF}T} e^{jn\phi_{RF}} e^{j\Phi_B} \end{bmatrix}$$

The transmitted and reflected power is then:

$$T^2 = \frac{E_0^2}{2}$$

$$\sum_{n=-\infty}^{\infty} \begin{bmatrix} \alpha^2 \xi J_n^2(\beta_1) + \alpha^2(1-\xi) J_n^2(\beta_2) + (1-\alpha)^2 \xi J_n^2(\beta_1 sinc(\gamma)) + \\ (1-\alpha)^2(1-\xi) J_n^2(\beta_2 sinc(\gamma)) + \\ 2\alpha^2 \sqrt{\xi - \xi^2} J_n(\beta_1) J_n(\beta_2) \cos(n\phi_{RF} + \Phi_B) + \\ 2(1-\alpha)^2 \sqrt{\xi - \xi^2} J_n(\beta_1 sinc(\gamma)) J_n(\beta_2 sinc(\gamma)) \cos(n\phi_{RF} + \Phi_B) - \\ 2(\alpha - \alpha^2) \xi J_n(\beta_1) J_n(\beta_1 sinc(\gamma)) \cos(n\omega_{RF}T) - \\ 2(\alpha - \alpha^2) \sqrt{\xi - \xi^2} J_n(\beta_1) J_n(\beta_2 sinc(\gamma)) \cos(n\omega_{RF}T + n\phi_{RF} + \Phi_B) - \\ 2(\alpha - \alpha^2) \sqrt{\xi - \xi^2} J_n(\beta_2) J_n(\beta_1 sinc(\gamma)) \cos(n\omega_{RF}T - n\phi_{RF} - \Phi_B) - \\ 2(\alpha - \alpha^2)(1-\xi) J_n(\beta_2) J_n(\beta_2 sinc(\gamma)) \cos(n\omega_{RF}T) \end{bmatrix}$$

$$R^2 = \frac{E_0^2(\alpha - \alpha^2)}{2}$$

$$\sum_{n=-\infty}^{\infty} \begin{bmatrix} \xi J_n^2(\beta_1) + (1-\xi) J_n^2(\beta_2) + \xi J_n^2(\beta_1 sinc(\gamma)) + (1-\xi) J_n^2(\beta_2 sinc(\gamma)) + \\ 2\sqrt{\xi - \xi^2} J_n(\beta_1) J_n(\beta_2) \cos(n\phi_{RF} + \Phi_B) + \\ 2\sqrt{\xi - \xi^2} J_n(\beta_1 sinc(\gamma)) J_n(\beta_2 sinc(\gamma)) \cos(n\phi_{RF} + \Phi_B) - \\ 2\xi J_n(\beta_1) J_n(\beta_1 sinc(\gamma)) \cos(n\omega_{RF}T) - \\ 2\sqrt{\xi - \xi^2} J_n(\beta_1) J_n(\beta_2 sinc(\gamma)) \cos(n\omega_{RF}T + n\phi_{RF} + \Phi_B) - \\ 2\sqrt{\xi - \xi^2} J_n(\beta_2) J_n(\beta_1 sinc(\gamma)) \cos(n\omega_{RF}T - n\phi_{RF} - \Phi_B) - \\ 2(1-\xi) J_n(\beta_2) J_n(\beta_2 sinc(\gamma)) \cos(n\omega_{RF}T) \end{bmatrix}$$

The equations above show that the fiber delay, T, shifts some of the contributions to the signal away from t=0. In the analysis of the phase modulator in a Sagnac loop, we low pass filtered the data to remove the components that have this dependence on T and we apply the same technique here. This means that only the terms that depend on the fiber delay, T, with n=0 will survive and simplifies the expressions for $T^2$ and $R^2$. Here we use the expression for $T^2$ to illustrate this point.

$$T^2 = \frac{E_0^2}{2}$$

$$\begin{bmatrix} \sum_{n=-\infty}^{\infty} \begin{bmatrix} \alpha^2 \xi J_n^2(\beta_1) + \alpha^2(1-\xi) J_n^2(\beta_2) + (1-\alpha)^2 \xi J_n^2(\beta_1 sinc(\gamma)) + \\ (1-\alpha)^2(1-\xi) J_n^2(\beta_2 sinc(\gamma)) + \\ 2\alpha^2 \sqrt{\xi - \xi^2} J_n(\beta_1) J_n(\beta_2) \cos(n\phi_{RF} + \Phi_B) + \\ 2(1-\alpha)^2 \sqrt{\xi - \xi^2} J_n(\beta_1 sinc(\gamma)) J_n(\beta_2 sinc(\gamma)) \cos(n\phi_{RF} + \Phi_B) \end{bmatrix} - \\ 2(\alpha - \alpha^2)[\xi J_0(\beta_1) J_0(\beta_1 sinc(\gamma)) + (1-\xi) J_0(\beta_2) J_0(\beta_2 sinc(\gamma))] - \\ 2(\alpha - \alpha^2) \sqrt{\xi - \xi^2} [J_0(\beta_1) J_0(\beta_2 sinc(\gamma)) + \\ J_0(\beta_2) J_0(\beta_1 sinc(\gamma))] \cos(\Phi_B) \end{bmatrix}$$

Now, the goal of this exercise is to determine $\beta_1$ and $\beta_2$. From these two quantities we can determine the chirp. We can determine $\alpha$ and $\xi$ separately and we generally assume that $\varphi_{RF}=\pi$. This is typically a good assumption for a single drive Mach Zehnder modulator. Then we are left with two unknowns, $\beta_1$ and $\beta_2$. This requires two equations, and we can meet that requirement simply by making the measurement at two different Mach Zehnder modulator bias points, $\Phi_B$. The most obvious bias points are peak bias, $\Phi_B=0$ and null bias, $\Phi_B=\pi$. In these situations, the cosine terms generate either +1 or −1, creating maximum contrast between the two bias points. The equations below show that by switching between peak and null bias, the signs of some of the terms change. This is sufficient to generate the two equations we need to independently extract the two unknowns, $\beta_1$ and $\beta_2$.

$$T^2_{peak} =$$

$$\frac{E_0^2}{2} \begin{bmatrix} \sum_{n=-\infty}^{\infty} \begin{bmatrix} \alpha^2 \xi J_n^2(\beta_1) + \alpha^2(1-\xi) J_n^2(\beta_2) + (1-\alpha)^2 \xi J_n^2(\beta_1 sinc(\gamma)) + \\ (1-\alpha)^2(1-\xi) J_n^2(\beta_2 sinc(\gamma)) + \\ 2\alpha^2 \sqrt{\xi - \xi^2} J_n(\beta_1) J_n(\beta_2) \cos(n\phi_{RF}) + \\ 2(1-\alpha)^2 \sqrt{\xi - \xi^2} J_n(\beta_1 sinc(\gamma)) J_n(\beta_2 sinc(\gamma)) \cos(n\phi_{RF}) \end{bmatrix} - \\ 2(\alpha - \alpha^2)[\xi J_0(\beta_1) J_0(\beta_1 sinc(\gamma)) + (1-\xi) J_0(\beta_2) J_0(\beta_2 sinc(\gamma))] - \\ 2(\alpha - \alpha^2) \sqrt{\xi - \xi^2} [J_0(\beta_1) J_0(\beta_2 sinc(\gamma)) + J_0(\beta_2) J_0(\beta_1 sinc(\gamma))] \end{bmatrix}$$

$$T^2_{null} =$$

$$\frac{E_0^2}{2} \begin{bmatrix} \sum_{n=-\infty}^{\infty} \begin{bmatrix} \alpha^2 \xi J_n^2(\beta_1) + \alpha^2(1-\xi) J_n^2(\beta_2) + (1-\alpha)^2 \xi J_n^2(\beta_1 sinc(\gamma)) + \\ (1-\alpha)^2(1-\xi) J_n^2(\beta_2 sinc(\gamma)) - \\ 2\alpha^2 \sqrt{\xi - \xi^2} J_n(\beta_1) J_n(\beta_2) \cos(n\phi_{RF}) - \\ 2(1-\alpha)^2 \sqrt{\xi - \xi^2} J_n(\beta_1 sinc(\gamma)) J_n(\beta_2 sinc(\gamma)) \cos(n\phi_{RF}) \end{bmatrix} - \\ 2(\alpha - \alpha^2)[\xi J_0(\beta_1) J_0(\beta_1 sinc(\gamma)) + (1-\xi) J_0(\beta_2) J_0(\beta_2 sinc(\gamma))] + \\ 2(\alpha - \alpha^2) \sqrt{\xi - \xi^2} [J_0(\beta_1) J_0(\beta_2 sinc(\gamma)) + J_0(\beta_2) J_0(\beta_1 sinc(\gamma))] \end{bmatrix}$$

Once we have $\beta_1$ and $\beta_2$. The chirp is simply given by:

$$\text{chirp} = \frac{\beta_1 - \beta_2}{\beta_1 + \beta_2}$$

Photonic VNA—Referenced Sagnac Loop Technique

Up to this point we have been concerned with quantifying the performance of electro-optic modulators such as phase modulators and intensity modulators. Now we extend these measurement techniques beyond electro-optic modulators to show how we may fully quantify the performance of an RF device. The detailed discussion of a single phase modulator in a Sagnac loop illustrated how all of the different RF delay terms contribute to the measured signals. With a thorough understanding of the mathematical framework for a single phase modulator we can extend the analysis to a more complicated system of multiple phase modulators and gain a great deal of interesting and useful information. We will show below how a system consisting of two phase modulators can be used to measure all of the RF parameters of a passive or active RF device, both amplitude and phase. The key to making these measurements is the separation of the various signal components through combinations of optical delay and RF delay in an exactly analogous fashion to the method used to separate the various oscillatory components of the single phase modulator in a Sagnac loop above.

Measurement of RF Device Reflection ($S_{11}$)

The simplest extension of the single phase modulator in a Sagnac loop still utilizes a single phase modulator, but instead of measuring the properties of the phase modulator, we are concerned with measuring the reflection off of an RF device, its $S_{11}$ in the two port terminology commonly used for vector network analysis. Adding an RF device that is separated from the phase modulator output by some electronic delay, $T_D$, results in additional phase modulated terms.

$$\Phi_F = \frac{\pi V}{V_\pi}\left(\cos(\omega_{RF} t) + \eta\rho\frac{\sin\gamma}{\gamma}\cos(\omega_{RF}(t-(\tau\to 0))+\phi_\rho) + \right.$$
$$\left. \eta_c\rho_D\frac{\sin\gamma}{\gamma}\cos(\omega_{RF}(t-(\tau\to 0)-2T_D)+\phi_{\rho_D})\right)$$

$$\Phi_R = \frac{\pi V}{V_\pi}\left(\frac{\sin\gamma}{\gamma}\cos\left(\omega_{RF}\left(1-\left(\frac{\tau}{2}\to-\frac{\tau}{2}\right)\right)\right)+\eta\rho\cos\left(\omega_{RF}\left(t-\frac{\tau}{2}\right)+\phi_\rho\right)+\right.$$
$$\left. \eta_c\rho_D\cos\left(\omega_{RF}\left(t-\frac{\tau}{2}-2T_D\right)+\phi_{\rho_D}\right)\right)$$

The reflection of the RF device, $\rho_D$, has a delay given by $2T_D$ because the RF signal must traverse the distance from the end of the phase modulator electrode to the RF device and back. Along with the delay, there is an additional phase term of the reflection, $\varphi_\rho\rho$. The phase modulation strength due to the reflection is modified by the combined loss of traveling through the phase modulator once and traveling through the RF cable twice. This is represented by $\eta_c$. The computation of the transmitted and reflected powers is exactly identical to the derivation given above for a single phase modulator in a Sagnac loop. However, now the measured signal contains additional oscillatory components. We still begin with the same expressions for the transmitted and reflected electric fields:

$$\begin{bmatrix}T\\R\end{bmatrix}=\begin{bmatrix}\alpha E_0\exp(j(\Omega_c t+\Phi_F(t)))-(1-\alpha)E_0\exp(j(\Omega_c t+\Phi_R(t-T)))-\\ j\sqrt{\alpha-\alpha^2}\,E_0\exp(j(\Omega_c t+\Phi_F(t)))-\\ j\sqrt{\alpha-\alpha^2}\,E_0\exp(j(\Omega_c t+\Phi_R(t-T)))\end{bmatrix}$$

Now, however, the forms of $\Phi_F$ and $\Phi_R$ have changed.

$$T = E_0 e^{j\Omega_c t}$$

$$\left[\alpha\sum_{n=-\infty}^{\infty}j^n J_n(\beta)e^{jn\omega_{RF}t}\sum_{n=-\infty}^{\infty}j^n J_n(\beta\eta\rho\text{sinc}(\gamma))e^{jn\omega_{RF}t}e^{-jn\omega_{RF}\tau}e^{jn\phi_\rho}\right.$$
$$\sum_{n=-\infty}^{\infty}j^n J_n(\beta\eta_c\rho_D\text{sinc}(\gamma))e^{jn\omega_{RF}t}e^{-jn\omega_{RF}(\tau+2T_D)}e^{jn\phi_{\rho_D}}-$$
$$(1-\alpha)\sum_{n=-\infty}^{\infty}j^n J_n(\beta\text{sinc}(\gamma))e^{jn\omega_{RF}t}e^{-jn\omega_{RF}(T-\tau/2)}\times$$
$$\sum_{n=-\infty}^{\infty}j^n J_n(\beta\eta\rho)e^{jn\omega_{RF}t}e^{-jn\omega_{RF}(T+\tau/2)}e^{jn\phi_\rho}$$
$$\left.\sum_{n=-\infty}^{\infty}j^n J_n(\beta\eta_c\rho_D)e^{jn\omega_{RF}t}e^{-jn\omega_{RF}(T+\tau/2+2T_D)}e^{jn\phi_{\rho_D}}\right]$$

$$R = -jE_0 e^{j\Omega_c t}\sqrt{\alpha-\alpha^2}$$

$$\left[\sum_{n=-\infty}^{\infty}j^n J_n(\beta)e^{jn\omega_{RF}t}\sum_{n=-\infty}^{\infty}j^n J_n(\beta\eta\rho\text{sinc}(\gamma))e^{jn\omega_{RF}t}e^{-jn\omega_{RF}\tau}e^{jn\phi_\rho}\right.$$
$$\sum_{n=-\infty}^{\infty}j^n J_n(\beta\eta_c\rho_D\text{sinc}(\gamma))e^{jn\omega_{RF}t}e^{-jn\omega_{RF}(\tau+2T_D)}e^{jn\phi_{\rho_D}}+$$
$$\sum_{n=-\infty}^{\infty}j^n J_n(\beta\text{sinc}(\gamma))e^{jn\omega_{RF}t}e^{-jn\omega_{RF}(T-\tau/2)}\times$$
$$\sum_{n=-\infty}^{\infty}j^n J_n(\beta\eta\rho)e^{jn\omega_{RF}t}e^{-jn\omega_{RF}(T+\tau/2)}e^{jn\phi_\rho}$$
$$\left.\sum_{n=-\infty}^{\infty}j^n J_n(\beta\eta_c\rho_D)e^{jn\omega_{RF}t}e^{-jn\omega_{RF}(T+\tau/2+2T_D)}e^{jn\phi_{\rho_D}}\right]$$

The key point to take from these computations is that we have introduced a new component to the signal that depends primarily on the reflection off of the device under test, $\rho_D$, and that has an RF delay of $(T+\tau/2+2T_D)$. Naturally, there are many other components present as well, but they typically have delays that differ from the primary component and are therefore easy to separate by filtering the Fourier transformed data. As an example, let us consider the reflection off of an RF open circuit.

Figure 17:
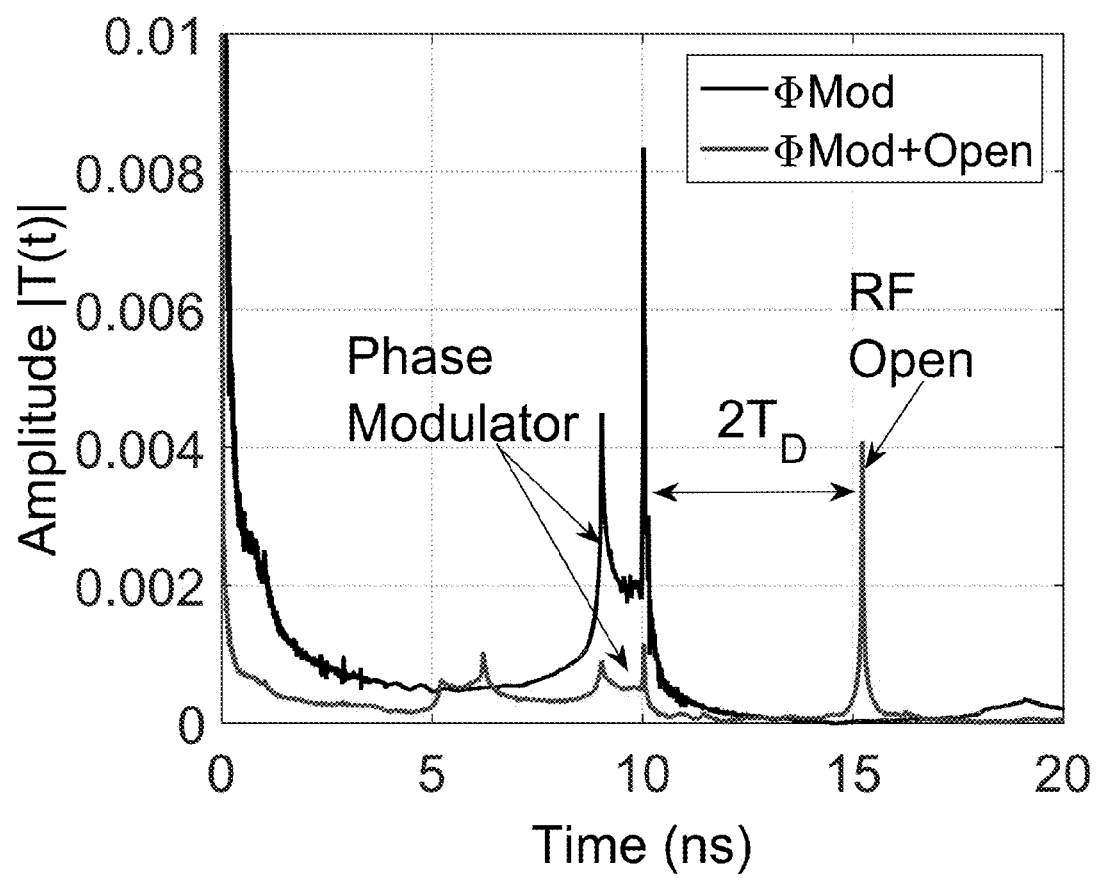
FIG. 17 shows single sided amplitude spectra of a reference phase modulator and the phase modulator plus the reflection off of an RF open circuit.

FIG. 17 shows single sided amplitude spectra of a reference phase modulator and the phase modulator plus the reflection off of an RF open circuit.

The black curve is the phase modulator by itself in the Sagnac loop. The red curve is the phase modulator followed by a length of RF cable that is terminated with an RF open circuit. The single peak at ~15.2 ns represents the signal from the RF open circuit. It falls at a delay of $(T+\tau/2+2T_D)$. If this one peak is digitally filtered out of the time domain and then inverse transformed, the transmitted power is primarily composed of the following cross term:

$$2\alpha(1-\alpha)J_1(\beta)J_1(\beta\eta_c\rho_D)J_0(\beta\,\text{sinc}(\gamma))J_0(\beta\eta_c\rho_D\,\text{sinc}(\gamma))$$
$$J_0(\beta\eta\rho)e^{j(\omega_{RF}(T+\tau/2+2TD)+\varphi_{\rho D})}$$

In general, the $J_0$ terms are all close to one so the signal is dominated by the product of the $J_1$ terms:

$$J_1(\beta)J_1(\beta\eta_c\rho_D)$$

The modulator $V_\pi$ can be measured independently, as can the cumulative loss of the modulator and the cable, $\eta_c$. This leaves a one adjustable parameter fit to determine the reflection off the RF device, $\rho_D$. The phase of the reflection, $\varphi_{\rho D}$, can be quickly extracted simply by taking the arctangent of the ratio of the imaginary and real components of the signal. The RF phase information is preserved because we are detecting the reflection off the DUT at the electric field level by isolating the heterodyne term.

Measurement of RF Device Transmission ($S_{21}$)

Determination of the RF $S_{21}$ of a device requires the transmission of a signal through the device. In order to measure the $S_{21}$, two phase modulators are employed, one before the device under test and one after the device under test. While the $S_{21}$ amplitude can be extracted by simply placing a DUT in the RF path before a single phase modulator, using two phase modulators with the DUT between them allows the measurement of $S_{21}$ amplitude and phase. Once again, the $S_{21}$ signal is separated from other signals by prudent selection of optical and RF delays. Since there are two phase modulators present, the forward going and reverse going optical signals are each modulated twice. In the interest of clarity, the equations below will neglect reflection terms (even though they are still present) to focus on the transmission.

$$\Phi_{F1} = \frac{\pi V_1}{V_{\pi 1}}\cos(\omega_{RF}t)$$

$$\Phi_{F2} = \frac{\pi V_2}{V_{\pi 2}}\cos(\omega_{RF}(t+T_{RF})+\phi_{RF})$$

$$\Phi_{R1} = \frac{\pi V_1}{V_{\pi 1}}\frac{\sin\gamma}{\gamma}\cos\left(\omega_{RF}\left(t-\left(\frac{\tau}{2}\to-\frac{\tau}{2}\right)\right)\right)$$

$$\Phi_{R2} = \frac{\pi V_2}{V_{\pi 2}}\frac{\sin\gamma}{\gamma}\cos\left(\omega_{RF}\left(t+T_{RF}-\left(\frac{\tau}{2}\to-\frac{\tau}{2}\right)\right)+\phi_{RF}\right)$$

We can also define $$\beta_1 = \frac{\pi V_1}{V_{\pi 1}}$$

$$\beta_2 = \frac{\pi V_2}{V_{\pi 2}}$$

$$\beta_1\text{sinc}(\gamma) = \frac{\pi V_1}{V_{\pi 1}}\frac{\sin\gamma}{\gamma}$$

$$\beta_2\text{sinc}(\gamma) = \frac{\pi V_2}{V_{\pi 2}}\frac{\sin\gamma}{\gamma}$$

These equations for the phase modulation highlight the fact that the two phase modulators may have different $V_\pi$ although they are typically quite well matched. They also highlight the fact that the voltage applied to the first phase modulator and the second phase modulator are different. This is closely related to the amplitude of the $S_{21}$ since the $S_{21}$ is essentially a measurement of RF power (voltage) at the output of the DUT compared to the RF power (voltage) at the input. Finally, the equations highlight that there is some RF pathlength between the two phase modulators denoted by $T_{RF}$, and that there may be an RF phase shift as well, $\varphi_{RF}$.

At this point, it is important to note that the two phase modulators are not only connected via an RF path, they are also connected via an optical path. The forward going optical signal first travels through phase modulator 1, next it travels through some length of optical fiber between the two phase modulators and then it travels through phase modulator 2. In contrast, the reverse going optical signal first passes through phase modulator 2, then passes through the same length of optical fiber between the phase modulators before passing through phase modulator 1. This is reflected in the equations below that propagate the optical field through the two phase modulators using the Jones matrix formalism:

$$\begin{bmatrix}T\\R\end{bmatrix} = \begin{bmatrix}\sqrt{\alpha} & -j\sqrt{1-\alpha}\\-j\sqrt{1-\alpha} & \sqrt{\alpha}\end{bmatrix}\begin{bmatrix}1 & 0\\0 & \Gamma(T)\end{bmatrix}\begin{bmatrix}\exp(j\Phi_{F2}(t))\\\exp(j\Phi_{R1}(t))\end{bmatrix}\begin{bmatrix}\Gamma(T_0)\\\Gamma(T_0)\end{bmatrix}$$

$$\begin{bmatrix}\exp(j\Phi_{F1}(t))\\\exp(j\Phi_{R2}(t))\end{bmatrix}\begin{bmatrix}\sqrt{\alpha} & -j\sqrt{1-\alpha}\\-j\sqrt{1-\alpha} & \sqrt{\alpha}\end{bmatrix}\begin{bmatrix}E_0 e^{j\Omega_c t}\\0\end{bmatrix}$$

$$\begin{bmatrix}T\\R\end{bmatrix} = \begin{bmatrix}\sqrt{\alpha} & -j\sqrt{1-\alpha}\\-j\sqrt{1-\alpha} & \sqrt{\alpha}\end{bmatrix}\begin{bmatrix}1 & 0\\0 & \Gamma(T)\end{bmatrix}\begin{bmatrix}\exp(j\Phi_{F2}(t))\\\exp(j\Phi_{R1}(t))\end{bmatrix}\begin{bmatrix}\Gamma(T_0)\\\Gamma(T_0)\end{bmatrix}$$

$$\begin{bmatrix}\exp(j\Phi_{F1}(t))\\\exp(j\Phi_{R2}(t))\end{bmatrix}\begin{bmatrix}\sqrt{\alpha}E_0 e^{j\Omega_c t} -\\j\sqrt{1-\alpha}E_0 e^{j\Omega_c t}\end{bmatrix}$$

$$\begin{bmatrix}T\\R\end{bmatrix} = \begin{bmatrix}\sqrt{\alpha} & -j\sqrt{1-\alpha}\\-j\sqrt{1-\alpha} & \sqrt{\alpha}\end{bmatrix}\begin{bmatrix}1 & 0\\0 & \Gamma(T)\end{bmatrix}\begin{bmatrix}\exp(j\Phi_{F2}(t))\\\exp(j\Phi_{R1}(t))\end{bmatrix}\begin{bmatrix}\Gamma(T_0)\\\Gamma(T_0)\end{bmatrix}$$

$$\begin{bmatrix}\sqrt{\alpha}E_0\exp(j(\Omega_c t+\Phi_{F1}(t)))-\\j\sqrt{1-\alpha}E_0\exp(j(\Omega_c t+\Phi_{R2}(t)))\end{bmatrix}$$

$$\begin{bmatrix}T\\R\end{bmatrix} = \begin{bmatrix}\sqrt{\alpha} & -j\sqrt{1-\alpha}\\-j\sqrt{1-\alpha} & \sqrt{\alpha}\end{bmatrix}\begin{bmatrix}1 & 0\\0 & \Gamma(T)\end{bmatrix}\begin{bmatrix}\exp(j\Phi_{F2}(t))\\\exp(j\Phi_{R1}(t))\end{bmatrix}$$

$$\begin{bmatrix}\sqrt{\alpha}E_0\exp(j(\Omega_c t+\Phi_{F1}(t-T_o)))-\\j\sqrt{1-\alpha}E_0\exp(j(\Omega_c t+\Phi_{R2}(t-T_o)))\end{bmatrix}$$

$$\begin{bmatrix}T\\R\end{bmatrix} = \begin{bmatrix}\sqrt{\alpha} & -j\sqrt{1-\alpha}\\-j\sqrt{1-\alpha} & \sqrt{\alpha}\end{bmatrix}\begin{bmatrix}1 & 0\\0 & \Gamma(T)\end{bmatrix}$$

$$\begin{bmatrix}\sqrt{\alpha}E_0\exp(j(\Omega_c t+\Phi_{F1}(t-T_o)+\Phi_{F2}(t)))-\\j\sqrt{1-\alpha}E_0\exp(j(\Omega_c t+\Phi_{R2}(t-T_o)+\Phi_{R1}(t)))\end{bmatrix}$$

$$\begin{bmatrix}T\\R\end{bmatrix} = \begin{bmatrix}\sqrt{\alpha} & -j\sqrt{1-\alpha}\\-j\sqrt{1-\alpha} & \sqrt{\alpha}\end{bmatrix}$$

-continued $$\begin{bmatrix} \sqrt{\alpha}\, E_0\exp(j(\Omega_c t + \Phi_{F1}(t-T_o) + \Phi_{F2}(t))) - \\ j\sqrt{1-\alpha}\, E_0\exp(j(\Omega_c t + \Phi_{R2}(t-T-T_o) + \Phi_{R1}(t-T))) \end{bmatrix}$$

$$\begin{bmatrix} T \\ R \end{bmatrix} = \begin{bmatrix} \alpha E_0\exp(j(\Omega_c t + \Phi_{F1}(t-T_o) + \Phi_{F2}(t))) - \\ (1-\alpha)E_0\exp(j(\Omega_c t + \Phi_{R2}(t-T-T_o) + \Phi_{R1}(t-T))) - \\ j\sqrt{\alpha-\alpha^2}\, E_0\exp(j(\Omega_c t + \Phi_{F1}(t-T_o) + \Phi_{F2}(t))) - \\ j\sqrt{\alpha-\alpha^2}\, E_0\exp(j(\Omega_c t + \Phi_{R2}(t-T-T_o) + \Phi_{R1}(t-T))) \end{bmatrix}$$

Now, let us focus only on the transmitted electric field $$T = E_0 e^{j\Omega_c t}$$

$$\begin{bmatrix} \alpha \sum_{n=-\infty}^{\infty} j^n J_n(\beta_1) e^{jn\omega_{RF}t} e^{-jn\omega_{RF}T_0} \sum_{n=-\infty}^{\infty} j^n J_n(\beta_2) e^{jn\omega_{RF}(t+T_{RF})} e^{jn\phi_{RF}} \\ -(1-\alpha)\sum_{n=-\infty}^{\infty} j^n J_n(\beta_2\,sinc(\gamma)) e^{jn\omega_{RF}(t+T_{RF})} e^{jn\phi_{RF}} e^{-jn\omega_{RF}(T+T_0)} \\ \sum_{n=-\infty}^{\infty} j^n J_n(\beta_1\,sinc(\gamma)) e^{jn\omega_{RF}t} e^{-jn\omega_{RF}T} \end{bmatrix}$$

The transmitted power is given by:

$$T^2 = E_0^2 \begin{bmatrix} \alpha^2 \sum_{n=-\infty}^{\infty}(\beta_1) \sum_{n=-\infty}^{\infty} J_n^2(\beta_2) + \\ (1-\alpha)^2 \sum_{n=-\infty}^{\infty} J_n^2(\beta_2\,sinc(\gamma)) \sum_{n=-\infty}^{\infty} J_n^2(\beta_1\,sinc(\gamma)) - \\ \alpha(1-\alpha)\sum_{n=-\infty}^{\infty} j^n J_n(\beta_1) e^{jn\omega_{RF}t} e^{-jn\omega_{RF}T_0} \\ \sum_{n=-\infty}^{\infty} j^n J_n(\beta_2) e^{jn\omega_{RF}t} e^{jn\omega_{RF}T_{RF}} e^{jn\phi_{RF}} \times \\ \sum_{n=-\infty}^{\infty} -j^n J_n(\beta_2\,sinc(\gamma)) e^{-jn\omega_{RF}t} e^{-jn\omega_{RF}T_{RF}} e^{-jn\phi_{RF}} e^{+jn\omega_{RF}(T+T_0)} \\ \sum_{n=-\infty}^{\infty} -j^n J_n(\beta_1\,sinc(\gamma)) e^{-jn\omega_{RF}t} e^{jn\omega_{RF}T} - \\ \alpha(1-\alpha) - \sum_{n=-\infty}^{\infty} j^n J_n(\beta_1) e^{-jn\omega_{RF}t} e^{jn\omega_{RF}T_0} \\ \sum_{n=-\infty}^{\infty} -j^n J_n(\beta_2) e^{-jn\omega_{RF}t} e^{jn\omega_{RF}T_{RF}} e^{-jn\phi_{RF}} \times \\ \sum_{n=-\infty}^{\infty} j^n J_n(\beta_2\,sinc(\gamma)) e^{jn\omega_{RF}t} e^{jn\omega_{RF}T_{RF}} e^{jn\phi_{RF}} e^{-jn\omega_{RF}(T+T_0)} \\ \sum_{n=-\infty}^{\infty} j^n J_n(\beta_1\,sinc(\gamma)) e^{jn\omega_{RF}t} e^{-jn\omega_{RF}T} \end{bmatrix}$$

The signal that we are primarily interested in for the $S_{21}$ contains the voltage that is applied to the second phase modulator, $V_2$. This is contained in the $\beta_2$ term. We also want to know the RF phase, $\varphi_{RF}$. The term that most clearly isolates these terms is the cross term between the two forward going phase modulation contributions.

$$J_1(\beta_1) e^{-j\omega_{RF}T_0} J_1(\beta_2) e^{j\omega_{RF}T_{RF}} e^{j\varphi_{RF}} J_0(\beta_2\,sinc(\gamma)) J_0(\beta_1\,sinc(\gamma))$$

Combining the exponentials we have:

$$J_1(\beta_1) J_1(\beta_2) e^{-j\omega_{RF}(T_0 - T_{RF})} e^{j\varphi_{RF}} J_0(\beta_2\,sinc(\gamma)) J_0(\beta_1\,sinc(\gamma))$$

This shows us that the signal we want will show up at the time difference between the optical delay between the two modulators, $T_o$, and the RF path delay between the two modulators, $T_{RF}$. This is useful because it positions the desired $S_{21}$ signal away from other signals as shown for a reference $S_{21}$ measurement and a 6 dB attenuator $S_{21}$ measurement in the figure below.

Figure 18:
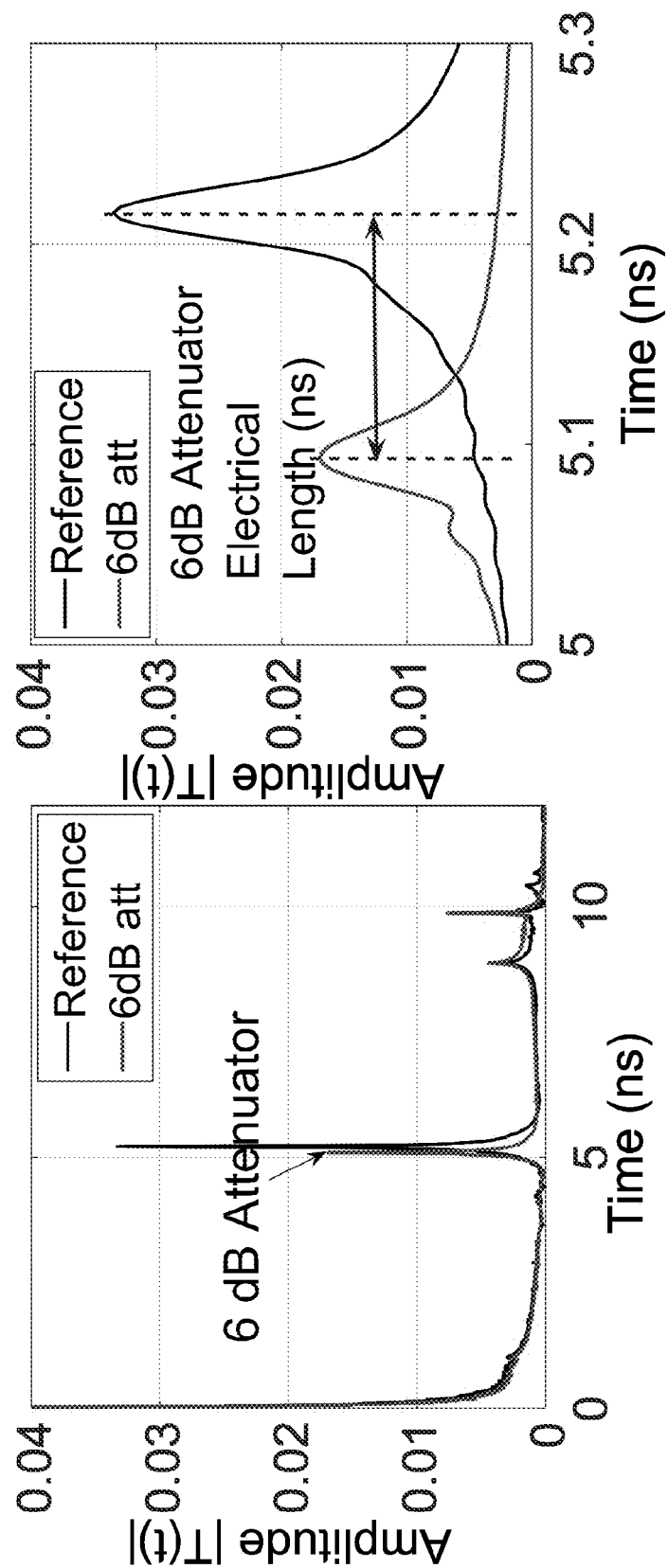
FIG. 18 shows: Left panel: Fourier transform of the transmitted optical power for the reference $S_{21}$ measurement and the 6 dB attenuator $S_{21}$ measurement. Right panel: Close up view of the peaks that contain the relevant $S_{21}$ data showing the electrical length of the 6 dB attenuator.

FIG. 18 shows: Left panel: Fourier transform of the transmitted optical power for the reference $S_{21}$ measurement (black) and the 6 dB attenuator $S_{21}$ measurement (red). Right panel: Close up view of the peaks that contain the relevant $S_{21}$ data showing the electrical length of the 6 dB attenuator.

In FIG. 18, the black curve is a measurement of the two phase modulators in the Sagnac loop connected by optical fiber of delay $T_o$ and an RF cable set of delay $T_{RF}$. The difference in the delay between the reference optical and RF path-lengths is slightly more than 5.2 ns. When a 6 dB attenuator is added to the RF path, the RF path becomes slightly longer so that the delay difference becomes smaller and the $S_{21}$ signal peak shifts to slightly less than 5.1 ns. The difference in the peak positions is the electrical length of the DUT in nanoseconds. It is possible at this point to digitally filter the desired peak using exactly the same procedure used to isolate the $S_{11}$ signal and transform back into the frequency domain. The resulting signal magnitude can be fit to:

$$J_1(\beta_1) J_1(\beta_2) J_0(\beta_2\,sinc(\gamma)) J_0(\beta_1\,sinc(\gamma))$$

And the RF phase can be extracted by taking the arctangent of the ratio of the imaginary and real parts of the signal. The $V_\pi$ of each of the two modulators is known from an earlier calibration step and $V_1$ is also known. This leaves $V_2$ as the only adjustable parameter in the fit. The ratio of $V_2$ with the DUT to $V_2$ without the DUT gives the $S_{21}$ amplitude.

These examples have illustrated how the $S_{21}$ and the $S_{11}$ of an RF device can be determined. It is clear that the key to making these measurements is the ability to separate the desired signal from the other signals that are present by using optical and RF delays.

The invention provides:

a technique to isolate the electronic information stored in the optical sidebands generated by electro-optic modulation that utilizes suppression of the optical carrier, a technique to measure the electro-optic characteristics of an electro-optic phase modulator that utilizes suppression of the optical carrier, a technique to measure the electro-optic characteristics of an electro-optic Mach-Zehnder intensity modulator that utilizes suppression of the optical carrier, a technique to measure the chirp parameter of an electro-optic Mach-Zehnder intensity modulator that utilizes suppression of the optical carrier, a technique to measure the RF reflection and transmission amplitude and phase of active and passive RF components using electro-optic modulators, a technique to measure the RF spectrum (Spectrum Analyzer) that uses electro-optic modulators, a technique for remote RF sensing that uses electro-optic modulators, a technique for in-line embedded RF test that uses electro-optic modulators, a technique for differential phase measurements of RF signals that uses electro-optic modulators, a technique for RF signal cancellation that uses electro-optic modulators, a technique for the detection and measurement of small RF frequency offsets that uses electro-optic modulators.

While the invention has been described with reference to specific embodiments, modifications and variations of the invention may be constructed without departing from the scope of the invention, which is defined in the following claims.

We claim:

1. A method comprising:
   determining key performance metrics of an electronic microwave or electro-optic device using optical signal processing, comprising:
   providing the device with an input and an output,
   providing an optical carrier frequency to the input of the device,
   generating optical sidebands with the device,
   providing the optical sidebands and the optical carrier frequency in the output of the device,
   suppressing and reducing amplitude of the optical carrier frequency in the output of the device,
   using radio frequency information to drive the device and isolate the optical sidebands, and
   determining desired parameters of the device from information contained in the optical sidebands.

2. The method of claim 1, wherein the using the radio frequency information comprises isolating electronic information stored in the optical sidebands generated by electro-optic modulation that utilizes the suppressing of the optical carrier.

3. The method of claim 1, further comprising measuring electro-optic characteristics of an electro-optic phase modulator by suppressing the optical carrier.

4. The method of claim 1, further comprising measuring electro-optic characteristics of an electro-optic Mach-Zehnder intensity modulator by utilizing the suppressing of the optical carrier.

5. The method of claim 1, further comprising measuring chirp parameter of an electro-optic Mach-Zehnder intensity modulator by utilizing the suppression of the optical carrier.

6. The method of claim 1, further comprising measuring RF reflection and transmission amplitude and phase of active and passive RF components using electro-optic modulators.

7. The method of claim 1, further comprising measuring RF spectrum (Spectrum Analyzer) using electro-optic modulators.

8. The method of claim 1, further comprising remote RF sensing that uses electro-optic modulators and the steps of claim 1.

9. The method of claim 1, further comprising in-line embedded RF testing using electro-optic modulators.

10. The method of claim 1, further comprising making differential phase measurements of RF signals using electro-optic modulators.

11. The method of claim 1, further comprising RF signal cancellation using electro-optic modulators.

12. The method of claim 1, further comprising detecting and measuring small RF frequency offsets using electro-optic modulators.

13. The method of claim 1, further comprising:
    providing a forward optical carrier to a first port of an electro-optic modulator,
    providing a reverse optical carrier to a second port of the optical modulator,
    providing a radio frequency input to the optical modulator,
    connecting a first optical fiber to the first port,
    providing a second optical fiber to the second port,
    connecting a n dB coupler to the first and second optical fibers,
    providing a fiber delay in the first optical fiber and coupling to the n dB coupler,
    providing a reflected port and a transmitted port on the coupler,
    producing the optical carrier and sidebands optical frequencies from the reflected port,
    producing the optical sidebands isolated from the forward optical carrier on the transmitted port, and
    using the isolated optical sidebands for the characterization.

14. The method of claim 13, further comprising:
    connecting a first modulator to the first port,
    connecting a second modulator to the second port,
    connecting a device under test to the first and second modulators,
    connecting an optical circulator to the reflected port,
    connecting a power meter to the transmitted port, and
    connecting the optical circulators to the power meter.

15. The method of claim 14, further comprising connecting a laser to the optical circulator.

16. The method of claim 15, further comprising connecting low speed photodiodes to the transmitted port and to the optical circulator.

17. Apparatus comprising:
    an electro-optic modulator having first and second ports,
    a device under test connected to the electro-optic modulator,
    a forward optical carrier connected to the first port of the electro-optic modulator,
    a reverse optical carrier connected to the second port of the optical modulator,
    a radio frequency input on the optical modulator,
    a first optical fiber connected to the first port,
    a second optical fiber connected to the second port,
    a n dB coupler connected to the first and second optical fibers,
    a fiber delay in the first optical fiber coupled to the n dB coupler,
    the coupler having a reflected port and a transmitted port,
    the forward optical carrier and sidebands optical frequencies provided from the reflected port,
    the optical sidebands isolated from the forward optical carrier provided on the transmitted port, and
    the isolated optical sidebands for the characterization of the optical modulator.

18. The apparatus of claim 17, further comprising:
    a first modulator connected to the first port,
    a second modulator connected to the second port,
    the device under test connected to the first and second modulators,
    an optical circulator connected to the reflected port,
    first and second low speed photodiodes connected to the transmitted port and to the optical circulator,
    a power meter connected to the first a second low speed diodes, and
    a laser connected to the optical circulator.

* * * * *